US007907891B2

(12) United States Patent
Proctor, Jr. et al.

(10) Patent No.: US 7,907,891 B2
(45) Date of Patent: Mar. 15, 2011

(54) PHYSICAL LAYER REPEATER UTILIZING REAL TIME MEASUREMENT METRICS AND ADAPTIVE ANTENNA ARRAY TO PROMOTE SIGNAL INTEGRITY AND AMPLIFICATION

(75) Inventors: James A. Proctor, Jr., Melbourne Beach, FL (US); Kenneth M. Gainey, Satellite Beach, FL (US); James C. Otto, West Melbourne, FL (US)

(73) Assignee: QUALCOMM Incorporated, San Diego, CA (US)

( * ) Notice: Subject to any disclaimer, the term of this patent is extended or adjusted under 35 U.S.C. 154(b) by 532 days.

(21) Appl. No.: 12/041,598

(22) Filed: Mar. 3, 2008

(65) Prior Publication Data

US 2008/0225775 A1     Sep. 18, 2008

Related U.S. Application Data

(60) Provisional application No. 60/904,368, filed on Mar. 2, 2007.

(51) Int. Cl.
    *H04B 3/36*     (2006.01)
(52) U.S. Cl. .............................. 455/7; 455/284
(58) Field of Classification Search ............. 455/7, 11.1, 455/13.1, 284
See application file for complete search history.

(56) References Cited

U.S. PATENT DOCUMENTS

| | | | |
|---|---|---|---|
| 5,265,150 A | 11/1993 | Helmkamp et al. | |
| 6,141,332 A | 10/2000 | Lavean | |
| 6,256,506 B1 | 7/2001 | Alexander, Jr. et al. | |
| 6,445,904 B1 | 9/2002 | Lovinggood et al. | |
| 6,697,603 B1 | 2/2004 | Lovinggood et al. | |
| 6,731,904 B1 | 5/2004 | Judd | |
| 6,745,003 B1 | 6/2004 | Maca et al. | |
| 6,889,033 B2 | 5/2005 | Bongfeldt | |
| 6,934,511 B1 | 8/2005 | Lovinggood et al. | |
| 6,990,313 B1 | 1/2006 | Yarkosky | |
| 7,027,770 B2 | 4/2006 | Judd et al. | |
| 7,035,587 B1 | 4/2006 | Yarkosky | |

(Continued)

FOREIGN PATENT DOCUMENTS

WO     WO9829962 A2     7/1998

(Continued)

OTHER PUBLICATIONS

Coefficients IEEE Transactions on Consumer Electronics, vol. 52, No. 3, Aug. 1987, pp. 109-114, XP011158561.

(Continued)

*Primary Examiner* — Tu X Nguyen
(74) *Attorney, Agent, or Firm* — Linda G. Gunderson

(57) ABSTRACT

Embodiments of a repeater environment can be operative to deploy a feedback cancellation loop that is adaptively coupled with an antenna array such that a selected metric can be applied to the antenna array and feedback cancellation loop combination to improve signal integrity and amplification. Illustratively, the feedback cancellation loop of the exemplary repeater can be adapted by a metric that operatively adapts weights provided by performing a selected linear algebra technique to the feedback cancellation loop such that the metric can be indicative of the level of transmitter signal present at a receive and can be derived based on performing a correlation between the transmitted signal and the receiver signal. Further, operatively, the exemplary repeater can maintain a delay sufficient to preferably ensure that transmitted signal is de-correlated with the desired receiver signal, and time aligned and correlated with the feedback leakage signal.

36 Claims, 16 Drawing Sheets

U.S. PATENT DOCUMENTS

| | | | |
|---|---|---|---|
| 7,068,973 B1 | 6/2006 | Lovinggood et al. | |
| 7,088,953 B2 | 8/2006 | Bongfeldt | |
| 7,263,293 B2 | 8/2007 | Ommodt et al. | |
| 7,333,771 B2 | 2/2008 | Maxwell | |
| 2004/0147221 A1 | 7/2004 | Sheynblat et al. | |
| 2006/0030262 A1 | 2/2006 | Anderson et al. | |
| 2006/0205343 A1 | 9/2006 | Runyon et al. | |
| 2006/0264174 A1* | 11/2006 | Moss | 455/16 |
| 2007/0109962 A1 | 5/2007 | Leng et al. | |

FOREIGN PATENT DOCUMENTS

| | | |
|---|---|---|
| WO | 02054628 | 7/2002 |
| WO | WO2006099209 | 9/2006 |

OTHER PUBLICATIONS

Chen et al.: "Transmission Filters With Multiple Flattened Passbands Based on Chirped Moire Gratings" IEEE Photonics Technology Letters, vol. 10, No. 9, Sep. 1998, XP011046212.

Juseop Lee, Sarabandi: "Design of Triple-Passband Microwave Filters Using Frequency Transformations" IEEE Transactions on Microwave Theory and Techniques, vol. 56, No. 1, Jan. 2008, pp. 187-193, XP011198986.

Macchiarella, Tamiaiio: "Design techniques for dual-passband filters" IEEE Transactions on Microwave Theory and Techniques, vol. 53, No. 11, Nov. 2005, pp. 3265-3271, XP001512574.

* cited by examiner

PHYSICAL LAYER REPEATER UTILIZING REAL TIME MEASUREMENT METRICS AND ADAPTIVE ANTENNA ARRAY TO PROMOTE SIGNAL INTEGRITY AND AMPLIFICATION

CLAIM OF PRIORITY

This application claims priority to U.S. Provisional Patent Application Ser. No. 60/904,368, filed on Mar. 2, 2007, entitled, "ADAPTIVE SAME FREQUENCY REPEATER TECHNIQUES," which is herein incorporated by reference in its entirety.

BACKGROUND

Conventionally, the coverage area of a wireless communication network such as, for example, a Time Division Duplex (TDD), Frequency Division Duplex (FDD) Wireless-Fidelity (Wi-Fi), Worldwide Interoperability for Microwave Access (Wi-max), Cellular, Global System for Mobile communications (GSM), Code Division Multiple Access (CDMA), or 3G based wireless network can be increased by a repeater. Exemplary repeaters include, for example, frequency translating repeaters or same frequency repeaters which operate in a physical layer or data link layer as defined by the Open Systems Interconnection Basic Reference Model (OSI Model).

Physical layer repeaters can be categorized into "same frequency" or "frequency translating" devices. The network architecture associated with where the repeater is going to be deployed will govern type of repeater used. If a same frequency repeater is used, this requires that the repeater receives and transmits on the same frequency concurrently. Accordingly, the repeater must achieve isolation between the receiver and transmitter using various antenna and digital/analog cancellation techniques. If a frequency translating repeater is used, the repeater receives a signal on a first frequency channel and then translates that to a second frequency channel for concurrent transmission. In this manner, isolation between the transmitter and receiver is achieved to a certain extent through frequency separation. Preferably, the antennas for receiving and transmitting as well as repeater circuitry are included within a same packaging in order to achieve manufacturing cost reductions, ease of installation, or the like. This is particularly the case when the repeater is intended for use by a consumer as a residential or small office based device where form factor and ease of installation is an important consideration. In such device, one antenna or set of antennas usually face, for example, a base station, access point, gateway, or another antenna or set of antennas facing a subscriber device.

For a repeater which receives and transmits concurrently, isolation between the receiving and transmitting antennas is a significant factor in overall repeater performance—this is the case whether repeating to the same frequency or repeating to a different frequency. More particularly, if the receiver and the transmitter antennas are not isolated properly, performance of the repeater can significantly deteriorate. Generally, gain of the repeater cannot be greater than the isolation to prevent repeater oscillation or initial de-sensitization. Isolation is generally achieved by physical separation, antenna patterns, or polarization. For frequency translating repeaters, additional isolation may be achieved utilizing band pass filtering, but antenna isolation generally remains a limiting factor in the repeater's performance due to unwanted noise and out of band emissions from the transmitter being received in the receiving antenna's in-band frequency range. The antenna isolation from the receiver to transmitter is an even more critical problem with repeaters operating on same frequencies and where band pass filtering does not provide additional isolation.

Often cellular based systems have limited licensed spectrum available and cannot make use of frequency translating repeating approaches and therefore use repeaters utilizing the same receive and transmit frequency channels.

As mentioned above, for a repeater intended for use with consumers, it would be preferable to manufacture the repeater to have a physically small form factor in order to achieve further cost reductions, ease of installation, and the like. However, the small form can result in antennas disposed in close proximity, thereby exasperating the isolation problem discussed above.

Current repeaters suffer an additional significant drawback in that they are not capable of separating leakage from their own transmitters from the signal they wish to repeat. As a result, conventional repeaters typically cannot optimize their system isolation and performance on real time bases resulting in poor operation or destructive effects to overall network performance. Specifically, current practices do not allow for the adaptive cancellation of unwanted signals in repeater environments while allowing the repeater to operate generally. Instead, current repeater deployments offer limited cancellation loops due to cost and complexity, are discrete implementations, and generally deployed in single band systems with no sub-band filtering. Further, current deployments of interference cancellation loops assume multipath delays and suffer from excess or unmatched delay in scattered signals, changing delays in signals (e.g., Doppler), and limited cancellation for wide band signals (e.g., ICs bandwidth).

From the foregoing, it is readily apparent that there exists a need for systems and methods to overcome the shortcomings of existing practices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The herein described systems and methods provide for a repeater environment operative to deploy a feedback cancellation loop that is adaptively coupled with an antenna array such that a selected metric can be applied to the antenna array and feedback cancellation loop combination to improve signal integrity and amplification. In an illustrative implementation, an exemplary repeater environment comprises, a transmitter, a receiver, an equalized feedback cancellation loop circuitry that is operatively coupled to an antenna array. In the illustrative implementation, the feedback cancellation loop can receive signals as input from a cooperating antenna array and provide output signals such as a feedback leakage signal to a cooperating antenna array.

In an illustrative operation, the feedback cancellation loop can be adapted by a metric that adapts weights to the feedback cancellation loop such that the metric can be indicative of level of transmitter signal present at a receive and can be derived based on performing a correlation between the transmitted signal and the receiver signal. Further, the exemplary repeater can operatively maintain a delay sufficient to ensure that the transmitted signal is de-correlated with a desired receiver signal, time aligned and correlated with the feedback leakage signal. In an illustrative operation, weights provided by the metric can be provided by performing a selected linear algebra technique (e.g. minimum means squared error—MMSE).

In an illustrative operation, the exemplary repeater environment can perform a method deploying an adaptively coupled equalized feedback cancellation loop and antenna array where the method comprises: a repeater transmitter leakage signal and desired receive signals can be received by one or more receivers (e.g., M receivers); the M receiver signals can be applied a weight representative of an M complex spatial receive weight; the weighted receiver signals can then be combined into a composite weighted signal; the composite weighted signal can be processed by an exemplary leakage cancellation block to product a post cancellation receive signal; the leakage cancellation block can calculate updated values for its feedback cancellation loop based on one or more of the composite weighted signal, the post cancellation receive signal, and the delayed transmitter signal—where a time constant associated with the update of the feedback values can be considered Tc.

Furthermore, in the illustrative method, the baseband filtering block can operatively filter the post cancellation receive signal to produce a filtered post cancellation received signal; the automatic gain control (AGC) block can utilize one or more of the pre-correlation leakage metric, residual leakage correlation metric, power in, power out, and isolation margin to perform automatic gain control to the filtered post cancellation receive signal to produce an AGC output signal; the spatial weighting block can calculate new receiver and transmitter complex spatial weights based on an LMS algorithm or other adaptive algorithm utilizing residual leakage correlation metric and a selected convergence time (e.g., greater than 10 times Tc); the spatial weighting block applies N complex spatial transmitter weights respectively to N copies of the AGC output signal; the N transmitters can then transmit the N weighted repeater transmit signals; and the N repeater transmit signals can be received by the M receivers to form M repeater transmit leakage signals summed with M desired receive signals.

In accordance with an aspect, a repeater for a wireless communication network, the repeater operative to provide feedback cancellation comprises: an antenna array comprising one or more antenna elements; and an equalized feedback cancellation loop operatively coupled to the antenna array, and configured to operate on input signals to derive a metric that is employed to increase signal isolation and signal gain, wherein the metric is indicative of level of a transmitter signal present at a receiver and is derived based on a correlation between a transmitted signal and a receiver signal, and wherein the repeater has a delay that allows the transmitted signal to be de-correlated with the desired receiver signal, the transmitted signal is time aligned, and the transmitted signal is correlated with a feedback leakage signal.

In accordance with yet another aspect, a method that facilitates feedback loop cancellation in a repeater environment comprises: receiving repeater transmitter leakage signal and receive signal at M number of receivers; applying M number of complex spatial receive weights on the M number of receivers to generate weighted receiver signals; combining the weighted receiver signals to generate a composite weighted signal; providing a selected time delay to the post cancellation leakage signal used to de-correlate the receive signal from the transmitter leakage signal to generate a de-correlated transmit signal; generating new receiver and transmitter complex spatial weights using an adaptive algorithm utilizing a correlation metric and a selected convergence time; and transmitting N number of weighted repeater signals by N transmitters.

Another aspect provides for a method to facilitate feedback loop cancellation in a repeater environment comprising: receiving repeater transmitter leakage signal and receive signal at a receiver to classify as a composite receive signal; generating a post cancellation receive signal by a leakage cancellation block; providing a selected time delay to the post cancellation leakage signal used to de-correlate the receive signal from the transmitter leakage signal to generate a de-correlated transmit signal; and transmit the de-correlated transmit signal.

In accordance with an aspect, a computer readable medium has stored thereon computer executable instructions for performing at least the following acts: receiving repeater transmitter leakage signal and receive signal at M number of receivers; applying M number of complex spatial receive weights on the M number of receivers to generate weighted receiver signals; combining the weighted receiver signals to generate a composite weighted signal; providing a selected time delay to the post cancellation leakage signal used to de-correlate the receive signal from the transmitter leakage signal to generate a de-correlated transmit signal; generating new receiver and transmitter complex spatial weights using an adaptive algorithm utilizing a correlation metric and a selected convergence time; and transmitting N number of weighted repeater signals by N transmitters.

In another aspect, a processor, comprising a memory having stored thereon computer executable instructions to cause the processor to performing at least the following acts: receiving repeater transmitter leakage signal and receive signal at a receiver to classify as a composite receive signal; generating a post cancellation receive signal by a leakage cancellation block; providing a selected time delay to the post cancellation leakage signal used to de-correlate the receive signal from the transmitter leakage signal to generate a de-correlated transmit signal; and transmit the de-correlated transmit signal.

In yet another aspect, a system that facilitates feedback loop cancellation in a repeater environment comprise: means for receiving repeater transmitter leakage signal and receive signal at M number of receivers; means for applying M number of complex spatial receive weights on the M number of receivers to generate weighted receiver signals; means for combining the weighted receiver signals to generate a composite weighted signal; means for providing a selected time delay to the post cancellation leakage signal used to de-correlate the receive signal from the transmitter leakage signal to generate a de-correlated transmit signal; means for generating new receiver and transmitter complex spatial weights using an adaptive algorithm utilizing a correlation metric and a selected convergence time; and means for transmitting N number of weighted repeater signals by N transmitters.

The following description and the annexed drawings set forth in detail certain illustrative aspects of the subject matter. These aspects are indicative, however, of but a few of the various ways in which the subject matter can be employed and the claimed subject matter is intended to include all such aspects and their equivalents.

DETAILED DESCRIPTION

Figure 1:
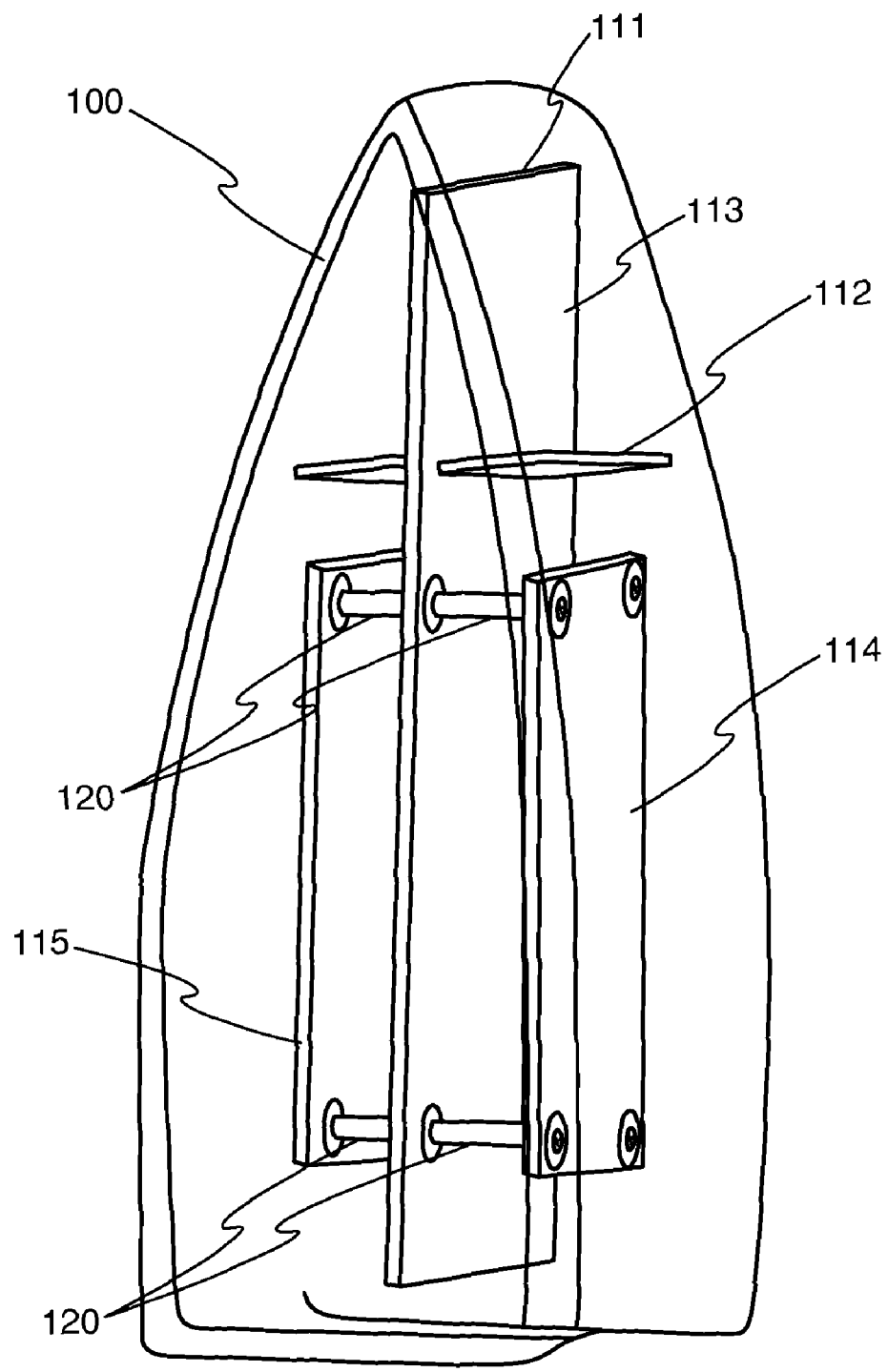
FIG. 1 is a block diagram of an exemplary enclosure of an illustrative repeater in accordance with the herein described systems and methods.

The current disclosure is related to the following U.S. Patent Applications filed on Mar. 3, 2008: CLOSED FORM CALCULATION OF TEMPORAL EQUALIZER WEIGHTS USED IN A REPEATER TRANSMITTER LEAKAGE CANCELLATION SYSTEM, Ser. No. 12/041,603; USE OF A FILTERBANK IN AN ADAPTIVE ON-CHANNEL REPEATER UTILIZING ADAPTIVE ANTENNA ARRAYS, Ser. No. 12/041,611; USE OF ADAPTIVE ANTENNA ARRAY IN CONJUNCTION WITH AN ON-CHANNEL REPEATER TO IMPROVE SIGNAL QUALITY, Ser. No. 12/041,615; AUTOMATIC GAIN CONTROL AND FILTERING TECHNIQUES FOR USE IN ON-CHANNEL REPEATER, Ser. No. 12/041,617; CONFIGURATION OF A REPEATER, Ser. No. 12/041,621; and SUPERIMPOSED COMPOSITE CHANNEL FILTER, Ser. No. 12/041,626, the contents of each of which are hereby incorporated by reference in their entirety.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments can be practiced without these specific details. In other instances, well-known structures and devices are shown in block diagram form in order to facilitate describing one or more embodiments.

In addition, various aspects of the present invention are described below. It should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems and apparatuses described herein are described in the context of boosting uplink pilot signals in a W-CDMA communications system. One skilled in the art should appreciate that similar techniques could apply to other communication environments.

As used in this application, the terms "component," "module," "system," and the like are intended to refer to a computer-related entity, either hardware, firmware, a combination of hardware and software, software, software in execution, firmware, middle ware, microcode, and/or any combination thereof. For example, a component can be, but is not limited to being, a process running on a processor, a processor, an object, an executable, a thread of execution, a program, and/or a computer. By way of illustration, not limitation, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various embodiments are described herein in connection with a wireless terminal or user equipment (UE). A wireless terminal or UE can also be called a system, subscriber unit, subscriber station, mobile station, mobile, mobile device, remote station, remote terminal, UE, user terminal, terminal, wireless communication device, user agent, or user device. A wireless terminal or UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with wireless terminal(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. Additionally it should be appreciated that a carrier wave can be employed to carry computer-readable electronic data or instructions such as those used in transmitting and receiving voice mail, in accessing a network such as a cellular network, or in instructing a device to perform a specified function. Accordingly, the term "machine-readable medium" refers to various physical media capable of storing, containing, and/or carrying instruction(s) and/or data (but does not refer to vacuum). Additionally, the herein described systems and methods can be deployed as machine readable medium as part of wireless channels capable of storing, containing, and/or carrying instructions and/or data. Of course, those skilled in the art will recognize many modifications may be made to the disclosed embodiments without departing from the scope or spirit of the invention as described and claimed herein.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA), TD-SCDMA, and TD-CDMA. cdma2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the above techniques may be described below in the context of uplink pilot multiplexing as it applies to LTE, and as a result, 3GPP terminology may be used in much of the descriptions below, where appropriate.

Feedback Cancellation and Metrics Overview:

The herein described systems and methods ameliorate the shortcomings of existing practices by providing a physical layer repeater comprising one or more antenna arrays adapted jointly to a feedback cancellation circuit (e.g., canceller). In an illustrative operation, a correlation metric can be measured after the cancellation stage of a repeater's processing, preferably cascaded after the array, as a means to adapt antenna array weight settings.

Illustratively, the canceller can perform better in some environments as compared to others depending on specific impulse response of a propagation channel from an exemplary repeater's transmit antenna to the exemplary repeaters receiver's antenna. The impulse response can be a function of scatters or local reflectors in proximity to an exemplary repeater. Since these reflections are spatially distributed, and the composite impulse response can be considered as a summation of these individual contributions to the total impulse response, the channel impulse response may be modified based on adapting the array. This adaptation can result in an impulse response which is either more favorable to a temporal feedback canceller, or less favorable to the temporal feedback canceller.

Figure 2:
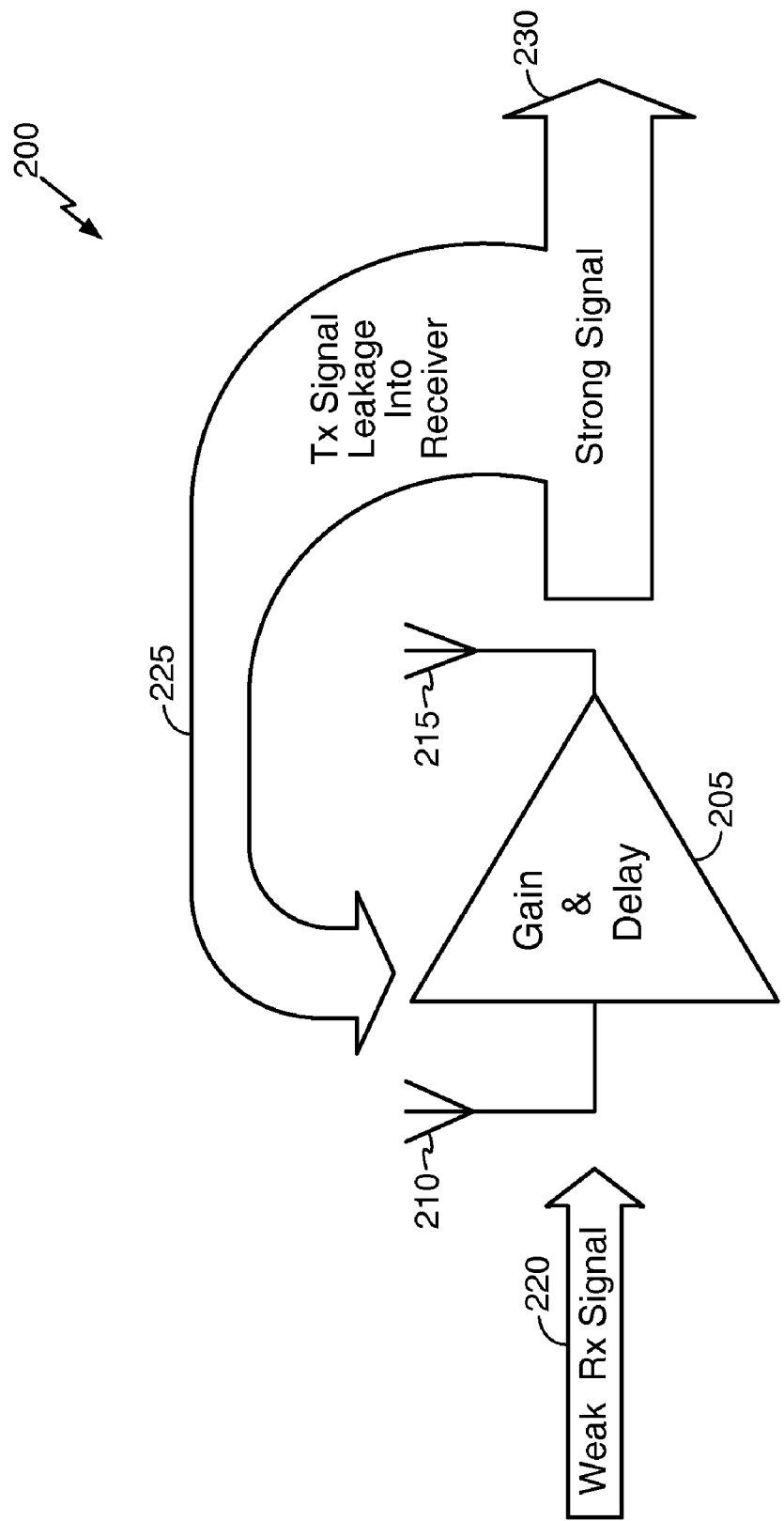
FIG. 2 is a block diagram of exemplary signal propagation for an exemplary RF repeater performing feedback cancellation in accordance with the herein described systems and methods.

By using performance of the temporal feedback canceller in cascade with the array to adapt the array, the combination can be made to work better. Thus, the array can be considered a "spatial equalizer" from which the canceller gains benefit. The feedback canceller can also include a temporal equalizer utilized to modify a copy of the transmit signal (e.g., at an output of the canceller) to match a portion of the signal at the receiver which is transmitter leakage. The net result is that this leakage signal may be substantially removed. Referring to FIG. 2, the signal received at the repeater can include both the weak signal to be repeated (220, which is referred to herein as the desired received signal), and some leakage from the repeater's transmitter (225). The feedback canceller acts on the received signal to cancel leakage from the received signal, according to current cancellation parameters (which may be equalizer weights for a temporal equalizer, as described more fully below). However, since the cancellation may be imperfect, the techniques herein are adaptive. That is, the canceller adapts over time to improve cancellation results. If the existing cancellation parameters are good, the result of the correlation operation will be small, since the current cancellation parameters are removing most (if not all) of the transmitter leakage. However, as the effectiveness of the current cancellation parameters decreases, the correlation between the transmitter leakage and the delayed transmitted signal increases. Accordingly, current techniques provide for adaptation of the cancellation parameters to improve cancellation of transmitter leakage.

In an illustrative embodiment, a correlation operation can be performed between the output of the canceller (that is, the received signal after feedback cancellation using current cancellation parameters) and an exemplary reference signal, generating one or more correlation metrics. The exemplary reference signal can be the output of the canceller (e.g., the signal to be transmitted) but delayed. The delay amount may be selected so that the reference signal and the output of the canceller are substantially time-aligned. The delay amount may include a propagation time indicative of the time the signal propagates from the transmit antenna to the receive antenna, as well as a processing time indicative of processing delays in the repeater itself (which may be significantly greater than the propagation time). In some embodiments, the delay amount may be determined a priori, may be determined in a calibration/setup operation, or may be determined and then updated later to improve time alignment. If the existing cancellation parameters are good, the result of the correlation operation will be small, since the current cancellation parameters are removing most (if not all) of the transmitter leakage. However, as the effectiveness of the current cancellation parameters decreases, the correlation between the transmitter leakage and the delayed transmitted signal increases. Accordingly, current techniques provide for adaptation of the cancellation parameters to improve cancellation of transmitter leakage. The cancellation parameters may be adapted as outlined below; for example, one or more algorithms may use the correlation metric to determine new cancellation parameters for an equalizer. The new cancellation parameters may be weights for one or more taps of an equalizer. Note that the term "equalizer" is used according to its use in the art and does not imply perfect equalization.

The control loop used to adjust the canceller may be referred to as an inner-loop, while the control loop which adjusts the setting of the array or spatial equalizer, can be considered an outer-loop. The inner-loop that is used to adapt or set the temporal equalizer weights within the canceller can be controlled by a minimum means squared error (MMSE) algorithm where control weights can be directly calculated, or by an adaptive algorithm utilizing a gradient based steepest decent class approach such as LMS, recursive least squared (RLS), perturbation based, and other similar algorithms where a metric can be used to adapt the algorithm.

In one example, the outer-loop (e.g., outer control loop) deployed to adapt the spatial weights can be based on a steepest decent algorithm such as LMS, RLS, perturbation based, and the like. In some embodiments, in order to ensure that the inner-loop and outer-loop co-exist without detrimental interaction, the inner-loop should have an effective time constant or adaptation rate of at least 5 times to 10 times the speed of the outer-loop. The herein described systems and methods provide an exemplary digital repeater operative such that the desired received signal and the transmitted repeated signal may be delayed by longer periods in time relative to each other.

The receiver can receive both a desired received signal, and the re-transmitted repeater signal. This repeated signal can be delayed sufficiently such that, on average, the desired received signal and leakage from the transmitter can be less correlated. Since the transmitted signal can be provided to an exemplary digital to analog (D/A) converter in a digital format prior to transmission, the transmitted signal can be delayed in base band as well to time-align samples with reception of the transmitter leakage. The delay imposed at base band can compensate for other delay due to additional base band processing, digital to analog converter delay, analog/RF filtering delay, propagation delay, reception processing delay, A/D converter delay, and other digital processing required prior to the base band cancellation block. This delay can allow for time alignment of the leakage signal and the stored/delayed transmitter signal. Since the leakage signal and the stored/delay transmitter signal are time illustratively aligned they can correlate strongly, while the desired received signal will not correlate strongly. Because the correlation between the stored/delay transmitter signal and the desired received signal is small, the output of the correlation operation is substantially indicative of the presence of transmitter leakage after cancellation using current cancellation parameters.

Exemplary Repeater:

FIG. 1 illustrates an exemplary enclosure for an illustrative repeater in accordance with various aspects described herein. A dipole dual patch antenna configuration along with repeater electronics can be efficiently housed in a compact enclosure 100 as shown in FIG. 1. The structure of the enclosure 100 can be such that it can be intuitively oriented in at least one of two ways; however, instructions can guide a user in connection with placement of the enclosure to maximize signal reception. In the exemplary dipole dual patch antenna configuration, a ground plane 113, incorporated with a printed circuit board (PCB) for the repeater electronics can be arranged parallel to and between two patch antennas 114 and 115 using, for example, standoffs 120. An isolation fence 112 can be employed to improve isolation in many instances.

Each of the patch antennas 114 and 115 can be arranged, for example, parallel to the ground plane 113 and can be printed on wiring board or the like, can be constructed of a stamped metal portion embedded in a plastic housing, or can be fabricated in a different manner. A planar portion of the PCB associated with the ground plane 113 can contain a dipole antenna 111 configured, for example, as an embedded trace on the PCB. Typically, the patch antennas 114 and 115 are vertically polarized and the dipole antenna 111 is horizontally polarized, although other embodiments can be used.

A combination of non-overlapping antenna patterns and opposite polarizations can be utilized to achieve approximately 40 dB of isolation between the receiving and transmitting antennas in a dual dipole dual patch antenna. Particularly, one of the transmitter and the receiver uses one of two dual switched patch antennas having vertical polarization for communication with an access point, while the other of the of the transmitter and the receiver employs the dipole antenna having horizontal polarization. This approach would be particularly applicable when the repeater is meant to repeat indoor network signals to indoor clients. In this case, the pattern of the antennas transmitting to the clients would typically need to be generally omni-directional, requiring use of the dual dipole antennas, as direction to the clients is unknown.

FIG. 2 depicts an illustrative block diagram of an exemplary signal flow within illustrative repeater environment 200. As shown, a weak received signal (the desired received signal) 220 can be received by antenna element 210, and act as input to gain and delay component 205. Gain and delay component 205 can process the weak received signal 220 to produce strong signal 230 as an output from antenna element 215. Further, a transmit signal leakage into receiver 225 can also act as input to gain and delay 205 at antenna element 210 for use when processing the weak received signal 220 to generate strong signal 230. The transmit leakage signal into the receiver 225 can be generated by a feedback cancellation loop (not shown) operatively coupled to the antenna elements 210 and 215. That is, the feedback cancellation loop generates a signal to be transmitted by the repeater, some of which is received by receiver 225 as a transmit leakage signal.

Figure 3:
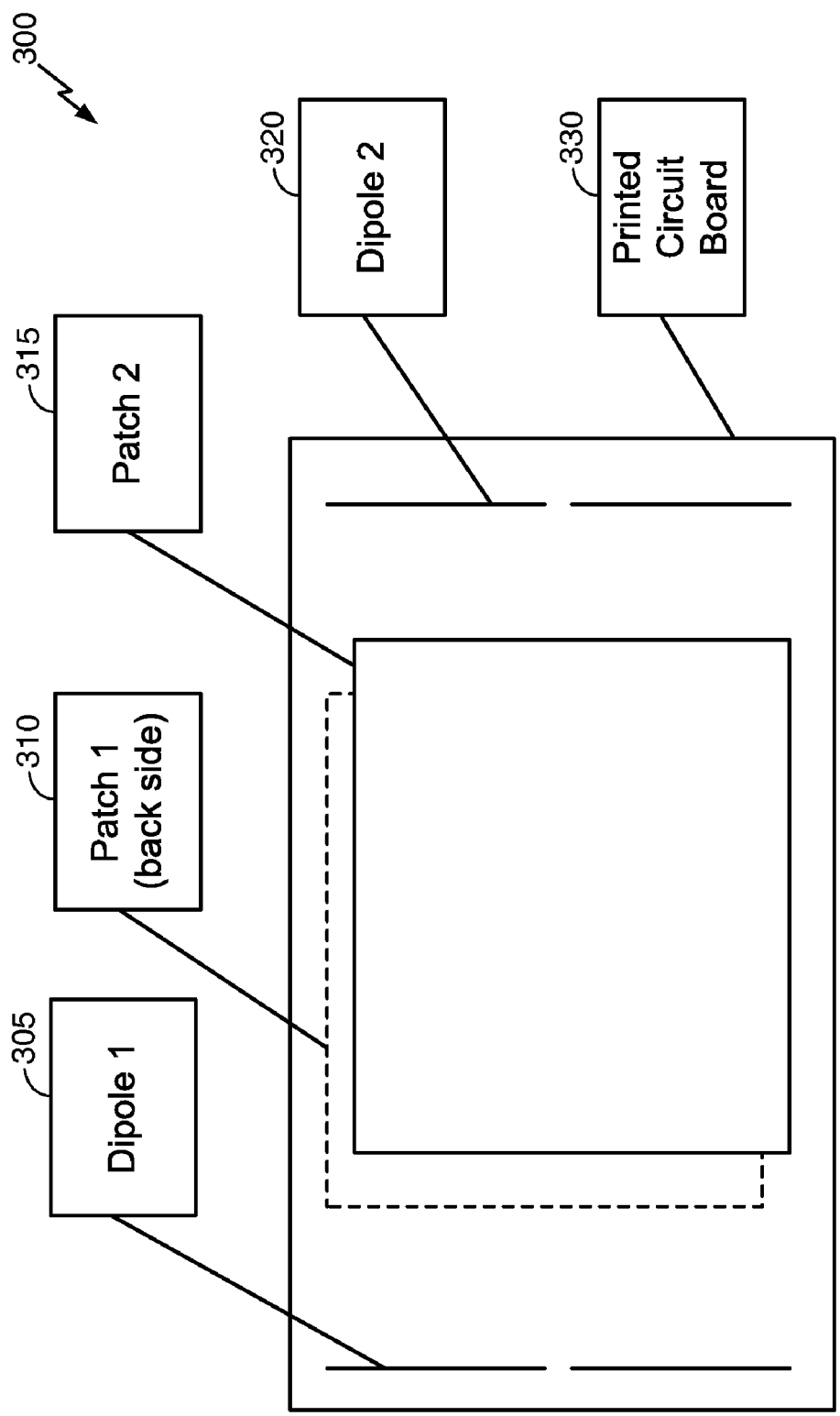
FIG. 3 is a block diagram of exemplary antenna repeater components in accordance with the herein described systems and methods.

FIG. 3 illustrates interaction of antenna elements of an exemplary repeater environment 300. Exemplary repeater environment 300 comprises printed circuit board 330 which includes dipole antennas 305 and 320, and further includes patch antennas 310 and 315. In an illustrative implementation, the dipole/patch antenna combination can achieve selected isolation between transmit and receive channels to allow for implementation of desired feedback cancellation. The antenna configuration of FIG. 3 is an example of a configuration of the antenna arrays that may be used in other embodiments described herein (where, e.g., patch antenna 310 is part of one antenna array and patch antenna 315 is part of the other antenna array).

Figure 4:
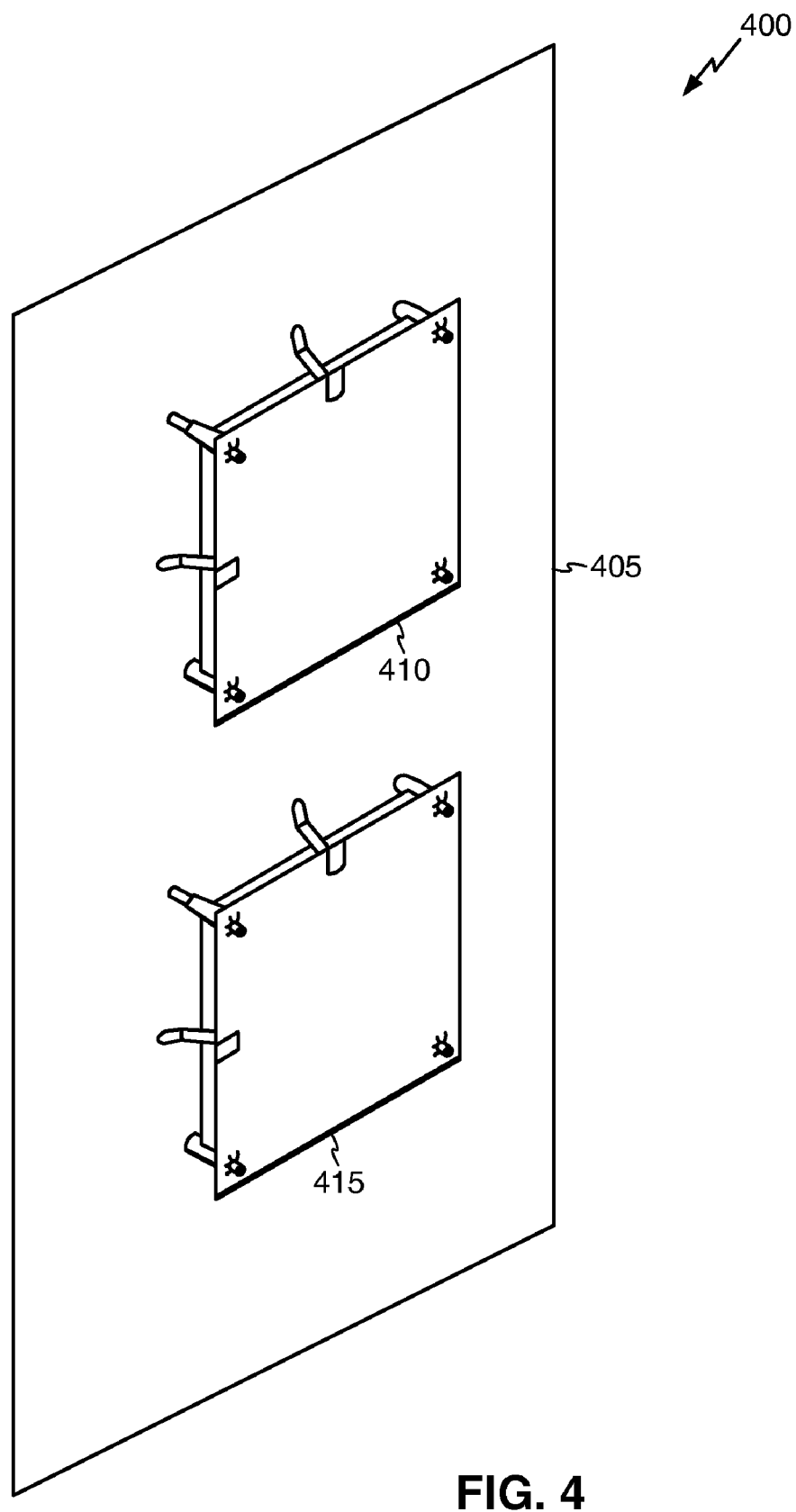
FIG. 4 is a block diagram of exemplary other repeater components in accordance with the herein described systems and methods.

FIG. 4 illustrates one side of another antenna configuration for use in providing selected isolation for an exemplary repeater. Antenna configuration 400 comprises PCB board 405 having one or more patch antennas 410 and 415 mounted thereto Note that typically there would be a like number of antenna patches on the opposite side of PCB and typically orientated in an opposite or advantageous polarization when compared to the polarization of antennas 410 and 415, such that a sufficient or even maximum amount of isolation is achieved between the antennas on opposite sides of the PCB. In an illustrative implementation, PCB board 405 can comprise one or more patch antennas 410 and 415 in various configurations and have more than one pair of patch antennas as well as an uneven number of respective patch antennas that make up a superset thereof. Antenna configuration 400 can, with the deployment of patch antennas 410 and 415 along with a like number of antenna on the opposite side of the PCB, provide selected isolation between a transmit and receive channel (e.g., transmit channels operatively coupled to one or more patch antennae and receive channels operatively coupled to one or more patch antennae) to cooperate with isolation and amplification provided by an exemplary cooperating feedback cancellation loop (e.g., feedback cancellation loop operatively coupled to an antenna array). The configuration of FIG. 4 shows another example of antenna arrays that can be used in embodiments described herein.

Figure 5:
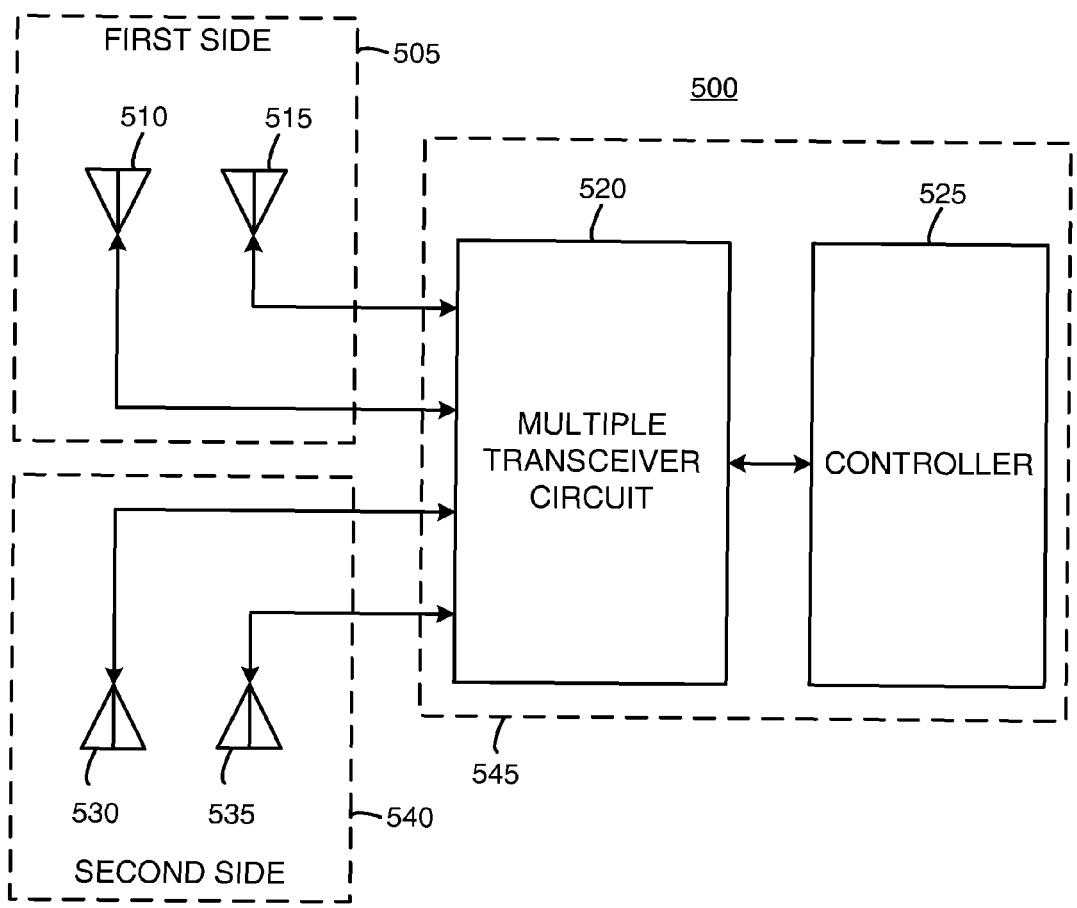
FIG. 5 is a block diagram of the cooperation of exemplary components of an illustrative RF repeater in accordance with the herein described systems and methods.

FIG. 5 shows exemplary repeater environment 500 operative to perform signal conditioning and amplification using one or more antenna arrays. Exemplary repeater environment 500 comprises a first antenna array 505 having antenna elements 510 and 515, second antenna array having antenna elements 530 and 535, processing circuitry 545 comprising multiple transceiver circuit 520 and controller 525. The antenna arrays 505 and 540 can cooperate with multiple transceiver circuit 520 which cooperates with controller 525 as part of operations of exemplary repeater environment 500. Signals can be received by antenna arrays 505 and 540 and passed to processing circuitry 545 for signal conditioning and processing and then passed back to antenna arrays 505 and 540 for communication with one or more cooperating components (e.g., base station of a CDMA wireless communications network).

In an illustrative implementation, antenna arrays 505 and 540 can comprise additional antenna elements as required to perform method(s) as described infra to achieve adaptive feedback cancellation realized by cooperation of one or more antenna arrays and the application of one or more metrics, such as one or more correlation results. Further, the number and configuration of the antenna arrays described herein are merely illustrative as the herein described systems and methods contemplate use of varying number of antenna arrays having varying configurations and comprising varying number of antenna elements.

Figure 6:
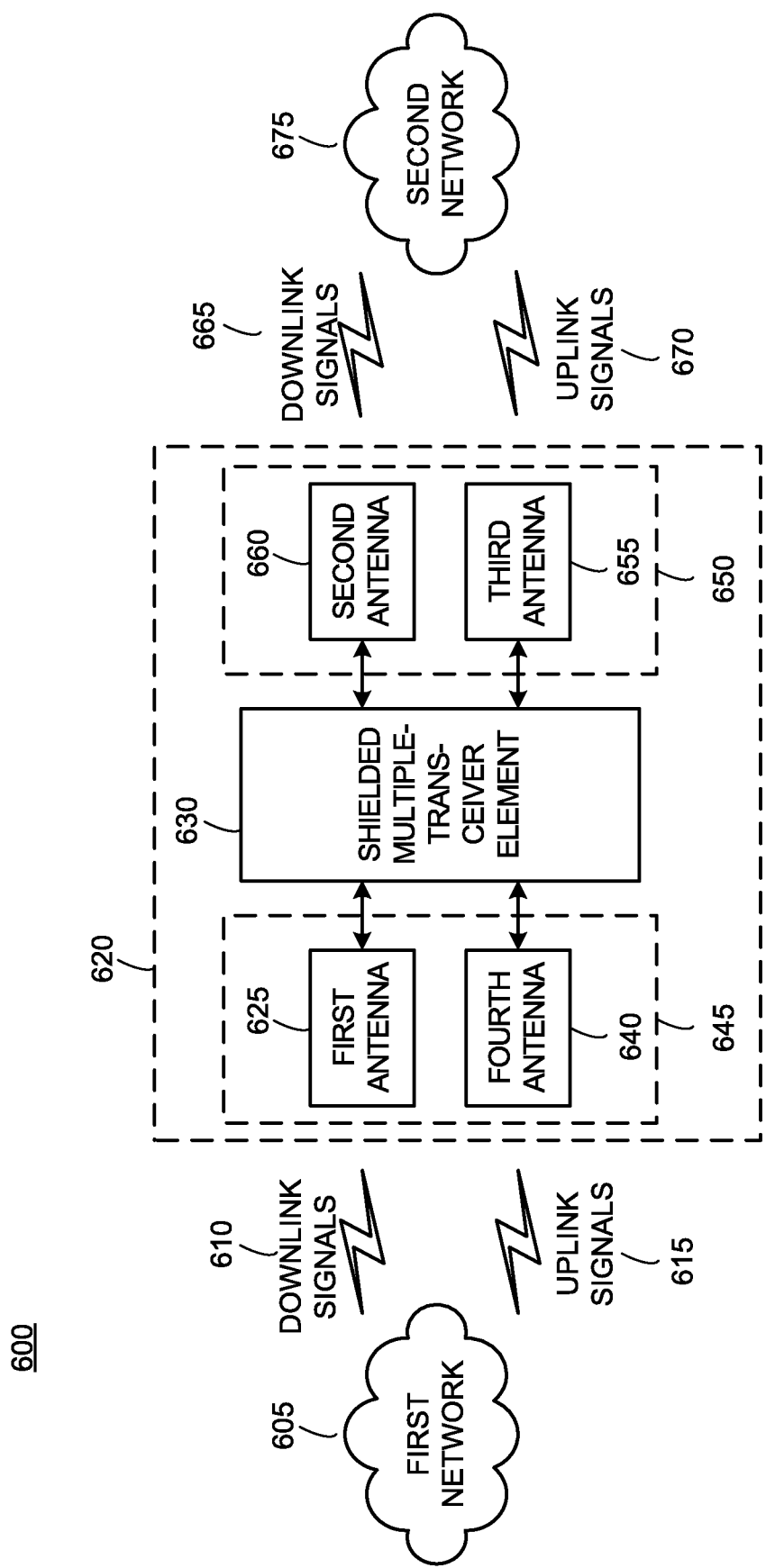
FIG. 6 is another block diagram of the cooperation of exemplary components of an illustrative RF repeater in accordance with the herein described systems and methods.

FIG. 6 illustrates interaction of exemplary repeater environment 600. Exemplary repeater environment 600 comprises processing circuitry 620 comprising antenna array 645 comprising first antenna 625 and fourth antenna 640, shielded multiple transceiver element 630, and antenna array 650 comprising second antenna element 660 and third antenna element 655. Operatively, downlink signals 610 originating from first network 605 can be processed by processing circuitry 620 to generate repeated downlink signals 665 for communication to second network 675, and uplink signals originating from second network 675 can be processed by processing circuitry 620 to generate repeated uplink signals 615 for communication to first network 605. Configuration and orientation of the antenna arrays 645 and 650 promote selected isolation of the unconditioned uplink and downlink signals provided to processing circuitry 620 and promote desired amplification and gain of such signals.

In an illustrative implementation, exemplary repeater environment 600 can comprise additional antenna elements as required to perform method(s) as described herein to achieve adaptive feedback cancellation realized by cooperation of one or more antenna arrays and the application of correlated metric. Further, it is appreciated that number and configuration of the antenna arrays described herein are merely illustrative as the herein described systems and methods contemplate use of varying number of antenna arrays having varying configurations and comprising varying number of antenna elements.

Figure 7:
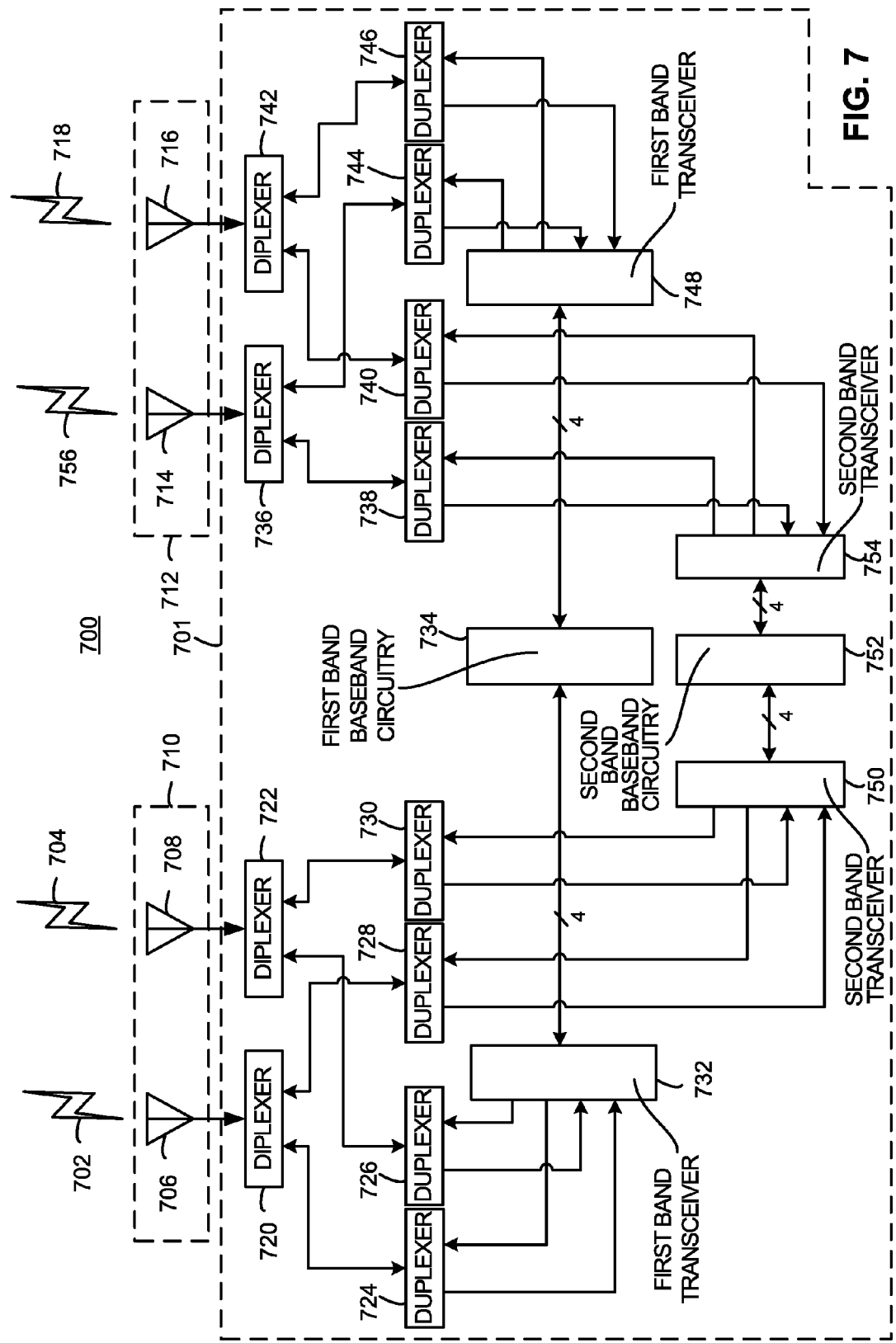
FIG. 7 is a block diagram of a frequency division duplexed (FDD) repeater having a dual band array in accordance with the herein described systems and methods.

FIG. 7 is a block diagram of a four-antenna, multiple-transceiver device 700 configured to operate in multiple bands in accordance with various illustrative implementations. This device 700 can transmit signals freely across two different bands using a variable configuration of the available antennae.

As shown in FIG. 7, the device 700 can include a shielded multiple-transceiver element 701 having a first side 710 and a second side 712. The shielded multiple-transceiver element 701 includes first band transceivers 732 and 748, first band baseband circuitry 734, second band transceivers 750 and 754, second band baseband circuitry 752, duplexers 724, 726, 728, 730, 738, 740, 744, and 746; diplexers 720, 722, 736, and 742; the first side 710 includes antennae 706 and 708; and the second side 712 includes antennae 714 and 716. Although not shown, the device 700 includes at least one electromagnetic isolation element (e.g., an isolation fence such as that shown in FIG. 1 and/or other isolation element), as described above, providing electromagnetic (EM) isolation between the antennae 706 and 708 on the first side 710, and the antennae 714 and 716 on the second side 712.

Illustratively, the antenna 706 can send or receive signals 702; the antenna 708 can send or receive signals 704; the antenna 714 can send or receive signals 756; and the antenna 716 can send or receive signals 718. These antennae 706, 708, 714, and 716 may be planar (e.g., patch) antennae, or any other desirable antenna types that may be effectively isolated from each other.

The first band transceiver 732 is connected to the antennae 706 and 708 through the duplexers 724, 726, 728, and 730, and the diplexers 720, and 722 to send or receive data via the antennae 706 and 708. The first band transceiver 748 is connected to antennae 714 and 742 through duplexers 738, 740, 744, and 746, and diplexers 736, and 742 to send or receive data via antennae 714 and 716. The first band baseband circuitry 734 is connected between first band transceiver 732 and first band transceiver 748 to provide communication between these two circuits.

The second band transceiver 750 is connected to antennae 706 and 708 through duplexers 728 and 730, and diplexers 720 and 722 to send or receive data via antennae 706 and 708. The second band transceiver 754 is connected to antennae 714 and 716 through duplexers 738 and 740, and diplexers 736 and 742 to send or receive data via antennae 714 and 716. The second band baseband circuitry 752 is connected between second band transceiver 750 and second band transceiver 754 to provide communication between these two circuits.

Diplexers 720, 722 are connected between antennae 706 and 708, and duplexers 724, 726, 728, and 730. They illustratively operate to determine which signals will be passed between antennae 706 and 708 and first band transceiver 732, and between antennae 706 and 708 and second band transceiver 750.

Diplexers 720, 722 are configured to split signals based on frequency, passing signals of a first frequency band to/from duplexers 724 and 726, and passing signals of a second frequency band to/from duplexers 728 and 730.

Duplexers 726, 728 are connected between diplexers 720, 722, and first band transceiver 732; and duplexers 728, 730 are connected between diplexers 720, 722, and second band transceiver 750. These duplexers 724, 726, 728, 730 serve to route signals of slightly different frequencies within the first or second band, respectively, to properly direct transmitted or received signals between first and second band transceivers 732 and 750 and diplexers 720, 722.

Diplexers 738, 742 are connected between antennae 714 and 716, and duplexers 738, 740, 744, and 746. They operate, for example, to determine which signals will be passed between antennae 714 and 716 and first band transceiver 748, and between antennae 714 and 716 and second band transceiver 754.

The diplexers 738, 742 are configured to split signals based on frequency, passing signals of the second frequency band to/from duplexers 738 and 740, and passing signals of the first frequency band to/from duplexers 744 and 746.

Duplexers 738, 740 are connected between diplexers 736, 742, and second band transceiver 754; and duplexers 744, 746 are connected between diplexers 736, 742, and first band transceiver 748. These duplexers 738, 740, 744, 746 serve to route signals of slightly different frequencies within the first or second band, respectively, to properly direct transmitted or received signals between first and second band transceivers 748 and 754 and diplexers 736, 742.

In alternate illustrative implementations some of duplexers 724, 726, 728, 730, 738, 740, 744, and 746, or diplexers 720, 722, 736, and 742 may be eliminated, since in some embodiments, certain permutations of band and antenna may be prohibited.

In other illustrative implementations, signals from different bands can be specifically assigned to certain transmission orientations. In such embodiments, outputs of duplexers 724, 726, 728, 730, 738, 740, 744, and 746 can be directly connected to antennae 706, 708, 714, or 716. For example, the first band could be designated to transmit/receive using a horizontal orientation, and the second band could be designated to transmit/receive using a vertical orientation.

Although the above illustrative implementations show use of only two or four antennae, along with two transceivers, this is by way of example only. Multiple-antennae, multiple-transceiver devices using different numbers of antennae or transceivers can also be used.

Furthermore, although the above illustrative implementations show antennae that are separate from a PCB, alternate embodiments could form the antennae directly on the opposite sides of the PCB. In such embodiments, insulating layers within the PCB can form the required non-conductive support members to separate the antennae from the ground plane. Also, in such embodiments, the transceiver will likely be formed off of the PCB, and connected to the antennae by wiring on the PCB. This sort of integrated structure can provide for a more compact device.

Figure 8:
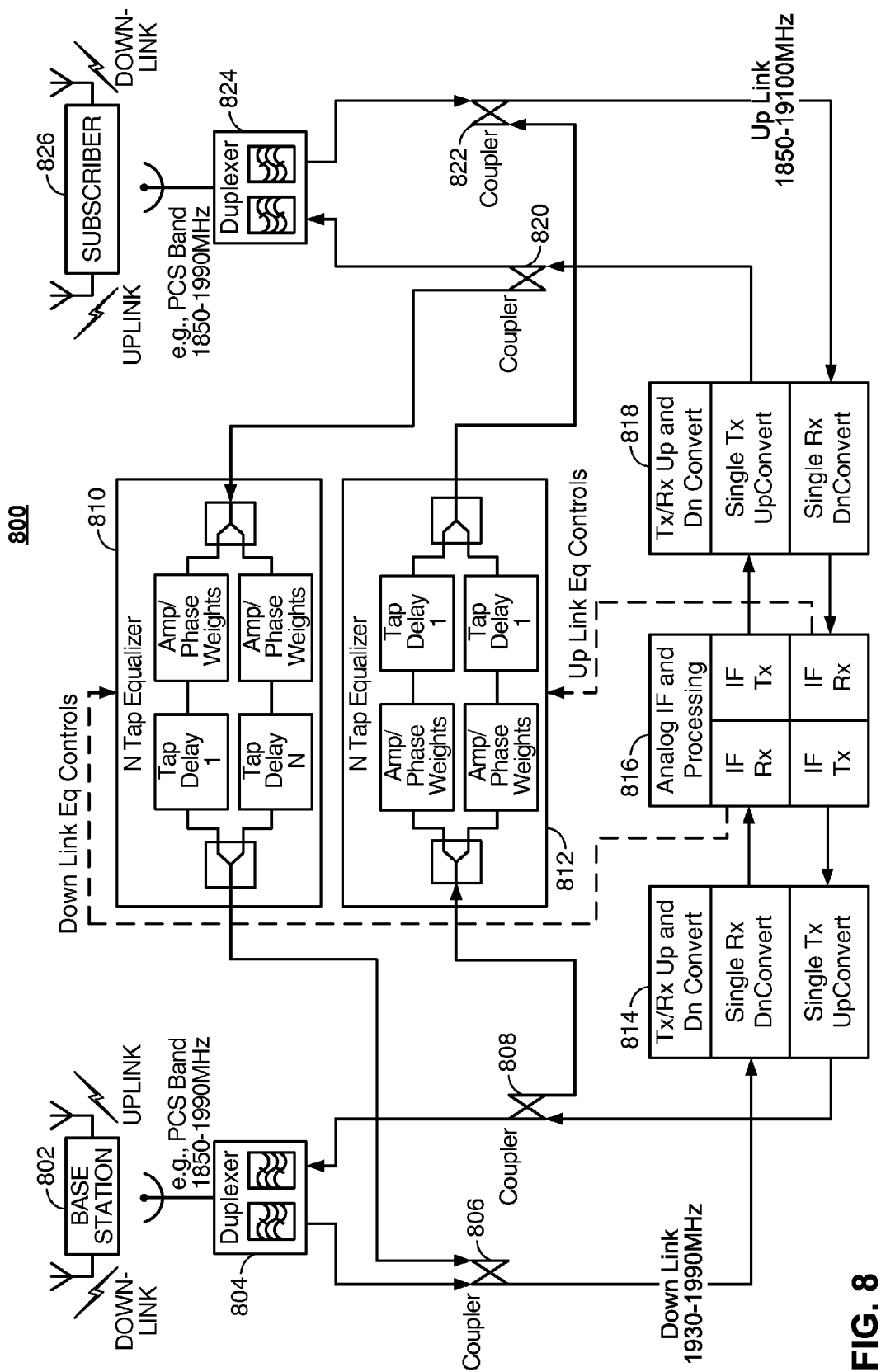
FIG. 8 is a block diagram of an exemplary FDD single band repeater having an analog equalizer and processor control of the analog equalizer in accordance with the herein described systems and methods.

FIG. 8 depicts an exemplary repeater environment 800 operative to deploy an FDD single band with analog equalizer and processor control of the equalizer in accordance with performing the exemplary method(s) described herein. As shown, exemplary repeater environment 800 comprises duplexer 804 connected to one or more antenna elements operative to receive/transmit signals (e.g., uplink and downlink signals) to exemplary base station 802; duplexer 824 connected to one or more antenna elements operative to receive/transmit signals (e.g., uplink and downlink signals) to exemplary subscriber unit 826; couplers 806, 808, 820, and 82; equalizers 810 and 812, transceivers 814 and 818, and filter component 816.

In an illustrative operation, as indicated by direction of arrowed lines, a signal (e.g., a downlink signal) can originate from base station and be received at antenna element coupled to duplexer 804 providing at its output the received signal which is operatively coupled with output of N tap equalizer 810 (e.g., feedback cancellation leakage signal) and provided as input to transceiver 814 where the signal is down-converted. The output of the transceiver 814 acts as input to analog intermediate frequency (IF) and processing component 816, and N tap equalizer 810. The output of component 816 is received by transceiver 818 where it is up-converted and passed along to coupler 820 where the signal is split to act as input to N tap equalizer 810 and duplexer 824. From duplexer 824, the conditioned (e.g., amplified) signal (e.g., uplink signal) is communicated to subscriber station 826 (e.g., a mobile handset). In the illustrative operation, N tap equalizer 810 and N tap equalizer 812 can process signals to perform equalization for received signals by applying amplitude/phase weights and selected delays to the signals).

In an illustrative operation, as indicated by direction of arrowed lines, a signal (e.g., downlink signal) can originate from subscriber station 826 and communicated to transceiver 818 of exemplary repeater environment 800 through antenna element, duplexer 824, and coupler 822. Operatively, the signal can be received by an antenna element to duplexer 824 and then passed to coupler 822 where the received signal from the subscriber station is coupled with the output of N tap equalizer 812. The combined coupled signal acts as input to transceiver 818 where it is processed according to a signal down convert technique and passed to analog intermediate filter and processing component 816 where the down converted signal is conditioned and passed to transceiver 814 where the signal is up converted. The up-converted signal is then split at the output of transceiver 814 by coupler 808 so that it acts as input to N tap equalizer 812 and duplexer 804. From duplexer 804 the conditioned signal (i.e., having feedback cancellation and metrics applied—as applied by the equalizer 812) is communicated to base station 802 through a cooperating antenna.

It is appreciated that although exemplary repeater environment 800 is illustrated including both analog and digital components to perform the method(s) as described herein, that such description is merely illustrative as the equalization/cancellation feedback components can be deployed exclusively as digital or analog components. Embodiments employing at least some digital components may provide cost and/or performance benefits.

Figure 9:
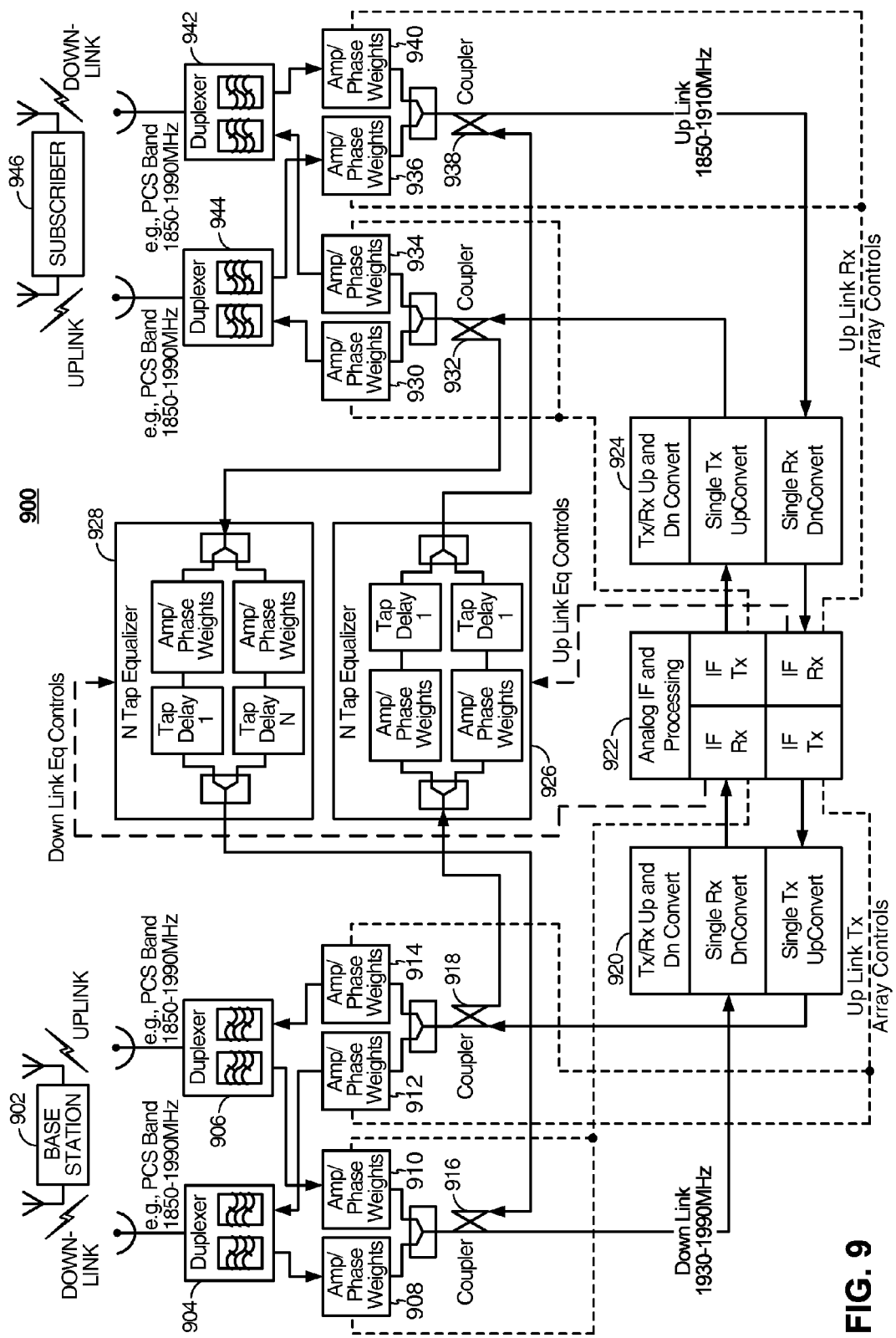
FIG. 9 is a block diagram of an exemplary FDD single band repeater having an analog equalizer and transmit/receive array with processor control of the equalizer and array in accordance with the herein described systems and methods.
Figure 15:
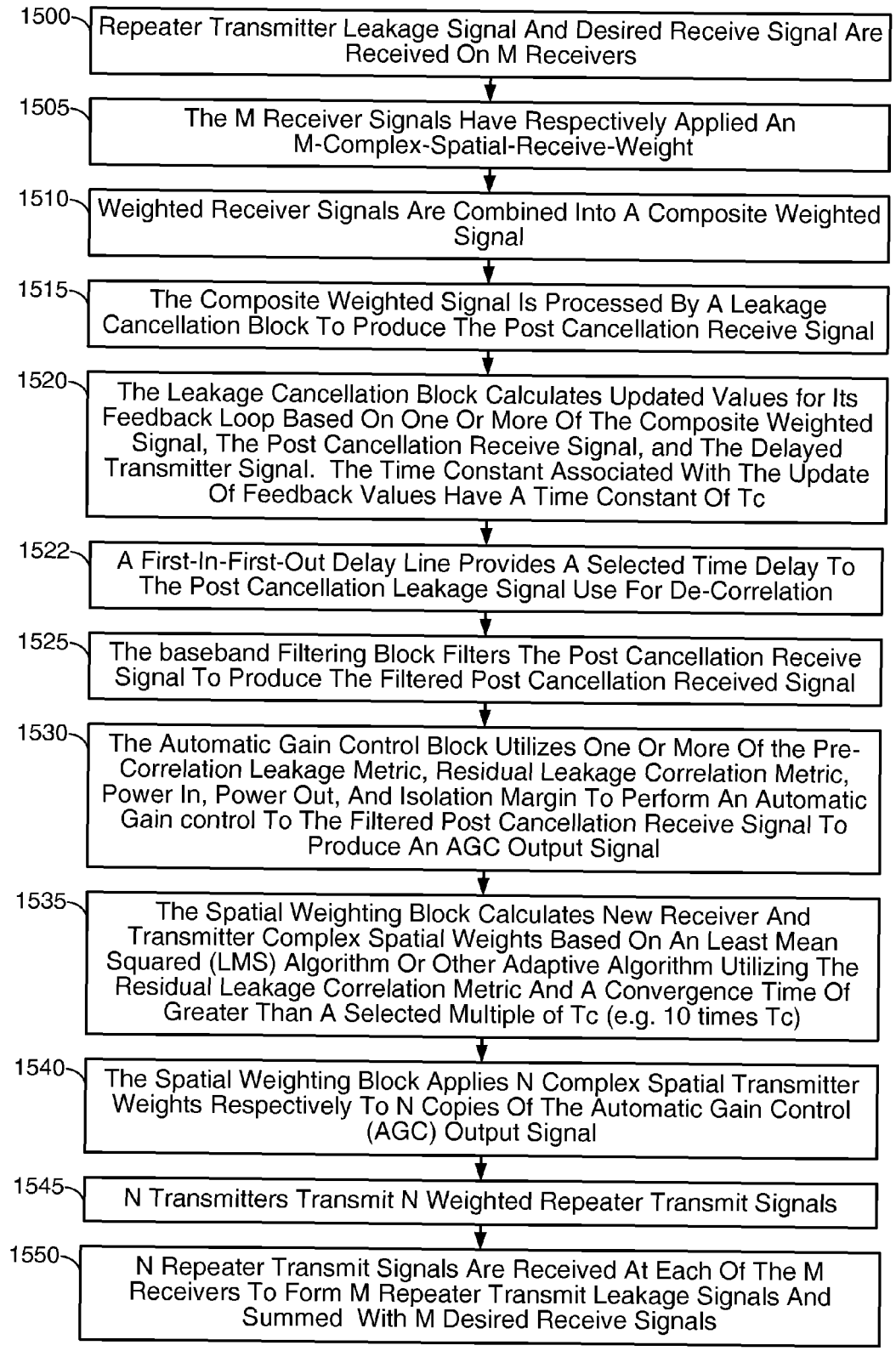
FIG. 15 is a flow diagram of one exemplary method for deploying metrics to improve signal integrity and amplification for a repeater.

FIG. 9 shows exemplary repeater environment 900 operative to deploy an FDD single band with analog equalizer and transmit/receive antenna array with processor control of the equalizer and antenna array in accordance with performing the exemplary method such as the method shown in FIG. 15 and described in the associated text. As is shown, exemplary repeater environment 900 comprises duplexers and 906 cooperating with antenna elements respectively (e.g., to form an antenna array), and operative to receive/transmit data (e.g., uplink channel data and downlink channel data) with base station 902. Further, exemplary repeater environment 900 comprises duplexers 944 and 946 cooperating with antenna elements respectively (e.g., to form an antenna array) and operative to receive/transmit data (e.g. uplink channel data and downlink channel data) with subscriber component 946. Further, duplexers 904 and 906 can be operatively coupled to couplers 916 and 918, respectively, and duplexers 944 and 942 can be operatively coupled to couplers 936 and 940, which allow for the communication of amplitude/phase weights 908, 910, 912, and 914 to duplexers 904 and 905, and amplitude/phase weights 930, 934, 936, and 940 to duplexers 944 and 942, respectively.

Further, as is shown, exemplary repeater environment 900 comprises transceivers 920 and 924 which are operatively coupled together by analog intermediate frequency and processing component 922 and are coupled to couplers 916 and 918, and 936 and 940, respectively. Further, exemplary repeater environment 900 comprises N tap equalizer components 928, and 926 which are operatively coupled to the outputs of transceivers 924 and 920 and cooperate with couplers 916, 918, 932, and 938. In an illustrative operation, as illustrated using the arrowed lines (solid and dashed), the received and transmitted signals can be processed by exemplary repeater environment 900 such that an exemplary feedback cancellation adaptive to the antenna arrays methods as described in FIG. 15 can be realized.

Figure 10:
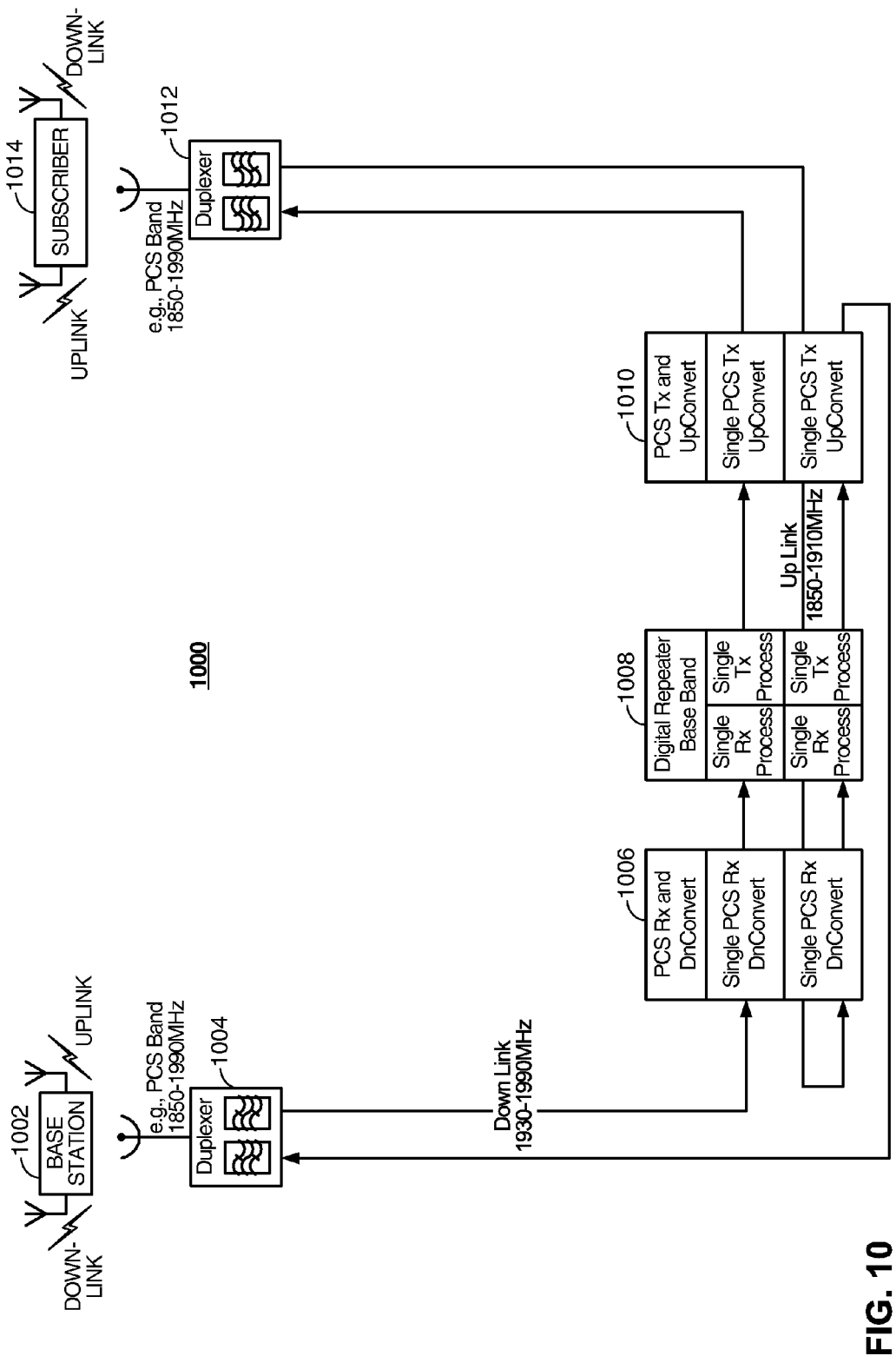
FIG. 10 is a block diagram of an exemplary FDD single band repeater having a digital interference cancellation system in accordance with the herein described systems and methods.

FIG. 10 depicts exemplary repeater environment 1000 operative to deploy an FDD single band with digital interference cancellation system in accordance with performing the exemplary method(s) described herein. As is shown, exemplary repeater environment 1000 comprises duplexer 1004 operatively coupled to an antenna element operative to receive signals from base station 1002 and providing input signals to transceiver 1006 and is operative to receive signals for processing from transceiver 1006. Further, exemplary repeater environment comprises digital repeater baseband component 1008 operatively coupled to transceiver 1006 and transceiver 1010 which is operatively coupled to duplexer 1012. In an illustrative implementation, duplexer is operatively coupled to an antenna element that allows for the communication of signals to a cooperating subscriber component 1014 (e.g., mobile handset).

In an illustrative operation, as shown by the arrowed lines, the received and transmitted signals can be processed by exemplary repeater environment 1000 such that an exemplary feedback cancellation adaptive to the antenna arrays method (s) as described herein can be realized.

Figure 11:
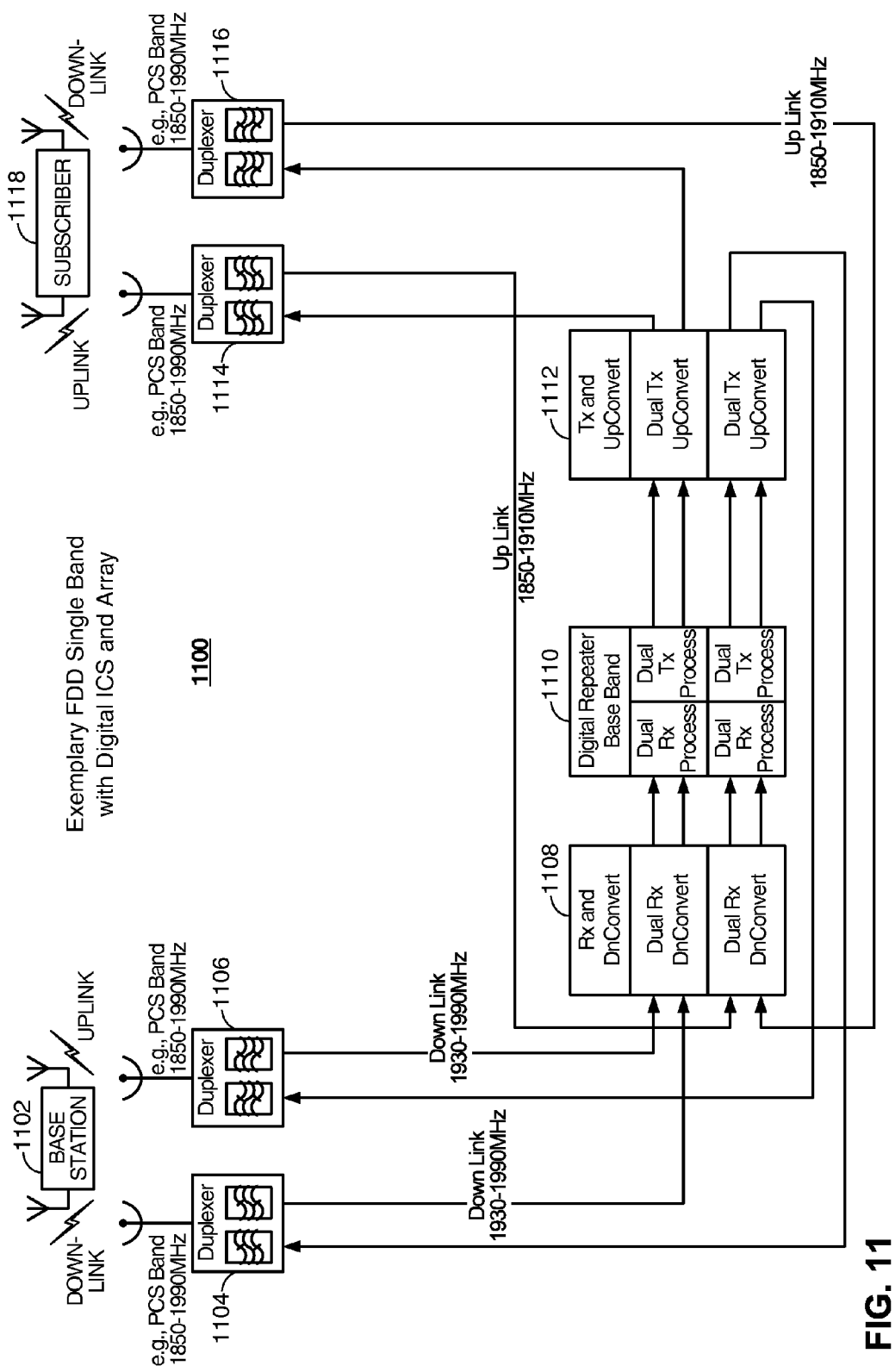
FIG. 11 is a block diagram of an exemplary FDD single band repeaters having a digital interference cancellation system and array in accordance with the herein described systems and methods.

FIG. 11 shows exemplary repeater environment 1100 operative to deploy an FDD single band with digital interference and an antenna array in accordance with the performing the exemplary method(s) described herein. As is shown, exemplary repeater environment 1100 comprises duplexers 1104, 1106, 1114, and 116; transceivers 1108 and 112; and digital repeater base band 110. As is shown, duplexers 1104, 1106, 114, and 116 can be operatively coupled to one or more antenna elements which can receive/transmit signals from base station 1102 and subscriber component 1118.

In an illustrative operation, as shown by the arrowed lines, the received and transmitted signals can be processed by exemplary repeater environment 1100 such that an exemplary feedback cancellation adaptive to the antenna arrays methods as described in FIG. 15 can be realized.

Figure 12:
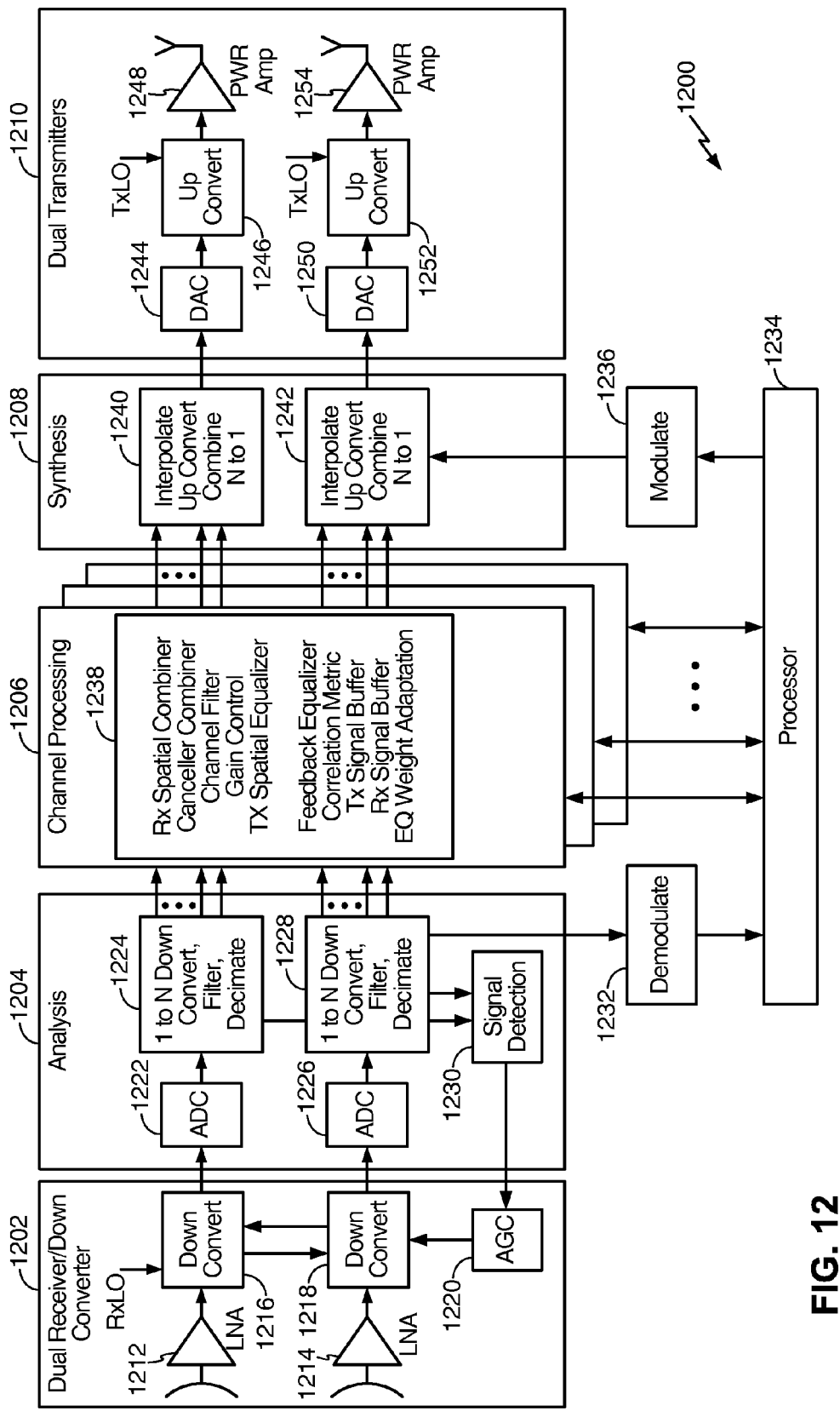
FIG. 12 is a block diagram showing the interaction of exemplary components having feedback cancellation and metric application mechanisms in accordance with the herein described systems and methods.

FIG. 12 is a block diagram showing the interaction of exemplary components of an illustrative repeater environment 1200 operative to perform the exemplary method(s) as described herein. FIG. 12 illustrates an implementation of an exemplary repeater environment 1200 deploying weighting calculations and applying metrics as part of a feedback loop cancellation technique. Exemplary repeater environment 1200 comprises dual receiver down converter module 1202, analysis modules 1204, one or more channel processing modules 1206, synthesis module 1208, dual transmitters 1210, demodulate module 1232, processor 1234, and modulate module 1236. Further, dual receiver/down converter module 1202 comprises antenna elements 1212 and 1214, down converters 1216, and 1218, and automatic gain control module 1220. Analysis modules 1204 further comprises analog to digital converters 1222 and 1226, signal detection module 1230, and 1 to N down convert, filter, decimate modules 1224 and 1228. One or more channel processing modules 1206 can comprise inter-operative portions 1238 receive spatial combiner, canceller combiner, channel filter, gain control, transmit spatial equalizer, feedback equalizer, correlation metric, transmission buffer, receive signal buffer, and equalizer weight adaption. Synthesis module 1208 comprises interpolate up convert combine N to 1 modules 1240 and 1242. Dual transmitters modules 1210 comprise digital to analog converters 1244 and 1250, up converters 1246 and 1252, power amplifier 1248 and 1254 cooperating with one or more antenna elements.

In an illustrative operation, signals can be received from a cooperative communications network (e.g., CDMA, GSM, GPRS, WiMax communications network) by dual receiver/down converter module 1202 where the received signals are illustratively processed by down converters 1216 and 1218 as part of a selected signal conditioning technique. The down converted signals can then be converted from analog signals to digital signals by analog-to-digital converters 1222 and 1226. The resulting digital signals can be further filtered for demodulation by 1 to N down convert, filter, decimate modules 1224 and 1228. The filtered signals can then be demodulated by demodulate module 1232 and communicated to processor 1234 for further signal processing. Further, as part of the illustrative implementation, during the analysis module operations, signals can be communicated by 1 to N down convert, filter, decimate module 1228 and 1224 to signal detection module 1230 where the control signal can be passed to automatic gain control module 1220 as part of a feedback loop. The output of the automatic gain control module 1220 can act as input to the down convert components 1216 and 1218.

In the illustrative operation, the outputs of the 1 to N down convert, filter, decimate components 1224 and 1228 along with instructions from processed data from processor 1234 can act as input to one or more channel processing modules 1238. In the illustrative operation, the one or more channel processing modules 1238 can operatively perform various signal processing and conditioning operations including correlation metrics, feedback equalization, gain control and channel filtering. The output of the one or more channel processing modules 1238 are communicated to synthesis module 1208 where the signals are interpolated, up converted and combines N to 1 along with a modulated signal from modulator 1236. The synthesized signals are then sent to dual transmitters module 1210 where digital to analog converters 1244 and 1250 convert the processed/conditioned digital signals to an analog signal for up converting by up convert components 1246 and 1252 for transmission through power amplifiers 1244 and antenna elements 1244 and 1248.

Figure 13:
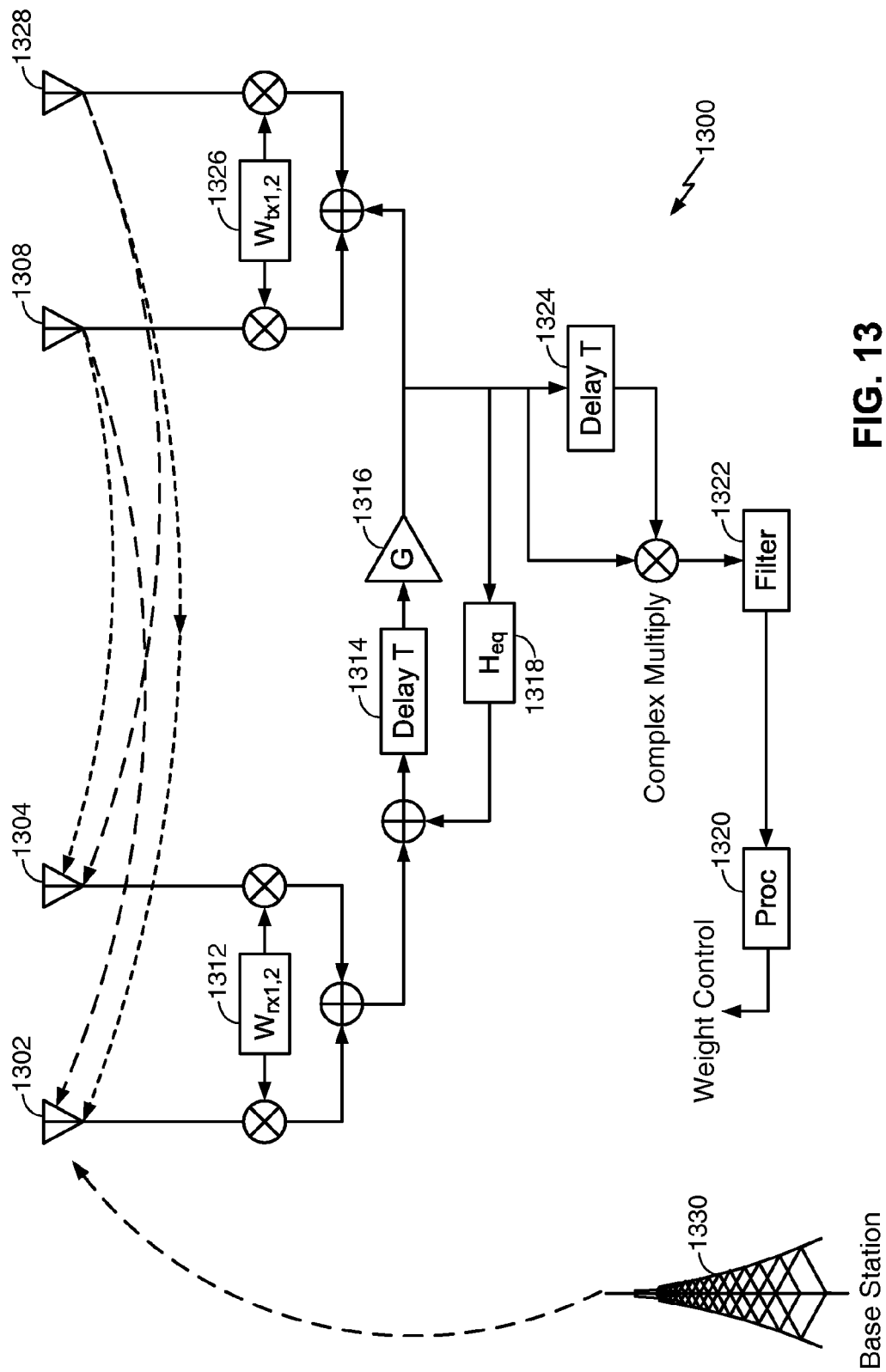
FIG. 13 is a block diagram showing the application of weights for use in conjunction with the application of a selected one or metrics in accordance with the herein described systems and methods.

FIG. 13 is a block diagram showing interaction of exemplary components and exemplary signal pathways to perform the method(s) as described herein as performed by exemplary repeater environment 1300. As is shown, exemplary repeater environment comprise antenna elements 1302, 1304, 1308, and 1328 (e.g., antenna array), adaptive antenna weight block 1312, delay block T 1314, gain block 1316, channel equalizer 1318, delay block T 1324, filter 1322, processor 1320, and adaptive antenna weight block 1326.

In an illustrative operation, a signal incident (e.g., receive signal) on antenna array 1302 and 1304 provided by exemplary base station 1330 can be processed by adaptive antenna weight block 1312 to apply weights to the receive signal to generate a composite signal that acts as input, along with the output of channel equalizer 1318 to delay T block 1314. Operatively, delay T block 1314 introduces a selected time delay prior to conditioning the signal by gain block 1316 (e.g. automatic gain control operations). Output of gain block 1316 operatively acts as input to a number of cooperating blocks comprising channel equalizer 1318, delay T block 1324, and as output to be summed by adaptive antenna weight block 1326. Operatively, delay T block provides a time delay to a complex multiplier which additionally receives input from the gain block 1316. The complex multiplier output acts as input to filter 1322 whose output acts as input to processor 1320. Processor 1320 can perform one or more selected weight control operations. Illustratively, the channel equalizer 1318 can provide input to an additional component which adds the output of the channel equalizer 1318 with a weighted composite received signal to act as input to delay T block 1314. Further as is shown by the dashed arrowed lines (e.g., propagation paths) conditioned transmit signals can be received at receiver antenna array 1302 and 1304 as part of performing the exemplary method as described in FIG. 15.

Figure 14:
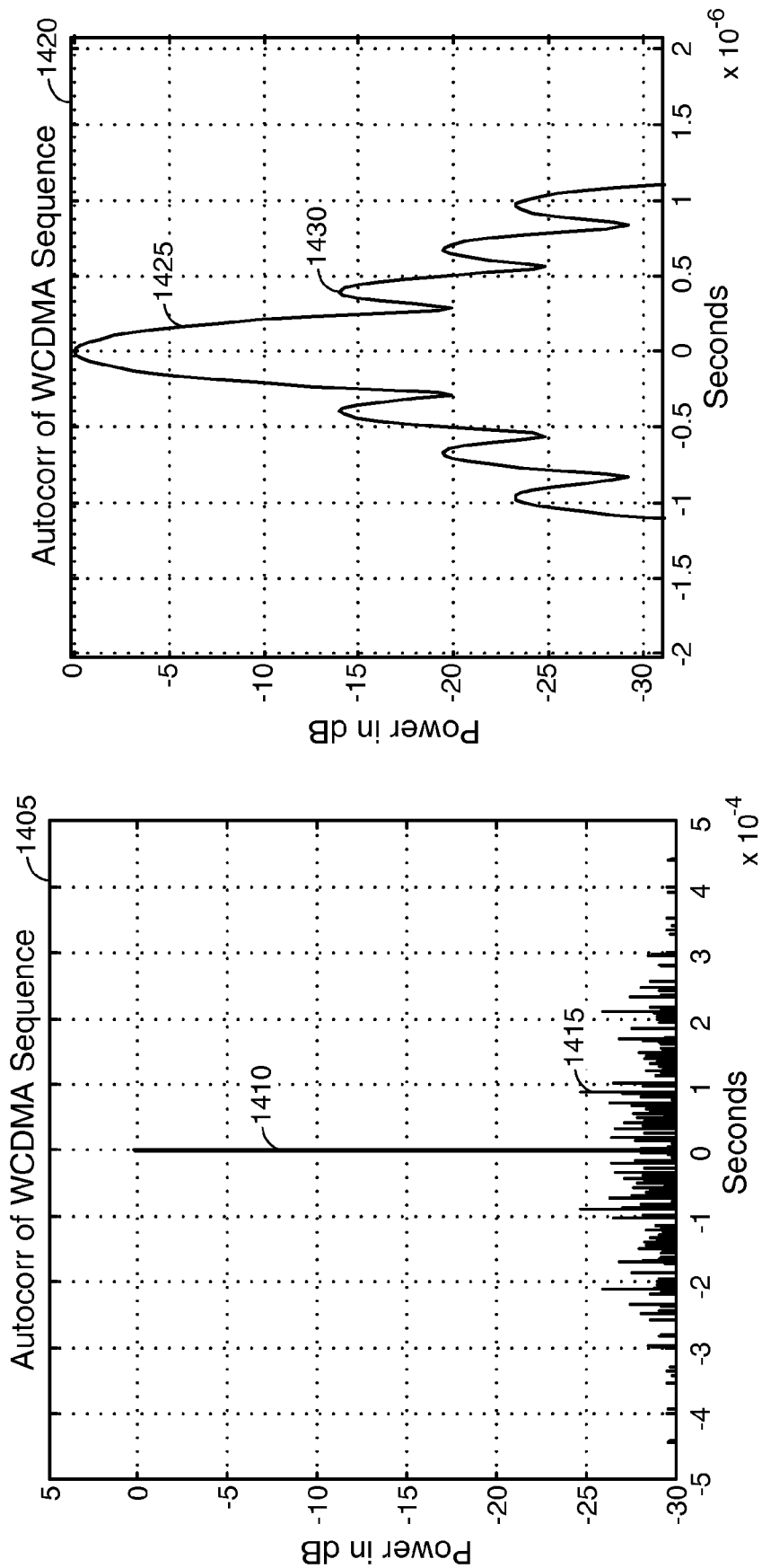
FIG. 14 is a graph diagram showing the impact of exemplary deployed feedback cancellation and metric application mechanisms in accordance with the herein described systems and methods.

FIG. 14 is a graphical diagram showing exemplary graph plots 1405 and 1420 describing results that show the autocorrelation of a WCDMA signal at different time scales. As can be seen in Graph plot 1405, when the time delay between the WCDMA signal and itself is zero, the correlation occurs to a high degree as shown at point 1410. In this case, the plot is normalized such that the maximum correlation is placed at 0 dBm and occurs at value 1410. At different time delays between the signal and itself the correlation is reduced dramatically as can be see at point 1415. Graph plot 1420 is a zoomed in version of the previous graph plot 1405. The increments in time on the X axis are microseconds. Illustratively, for a WCDMA signal with a bandwidth of 3.84 MHz, a time delay equal to the inverse of this bandwidth can be required to de-correlate the signal with itself. This can be seen at the first null between point 1425 and 1430. Providing a delay in the repeater in excess of the inverse of the bandwidth of the signal being repeated will generally provide for this de-correlation effect and allow the correlation metric to operate effectively. Further, ensuring time alignment of the receiver transmitter leakage signal with the cancellation signal produced by the feedback cancellation equalizer in the cancellation block allows proper cancellation and calculation of cancellation weighting, with no adverse effect on the desired receiver signal due to misalignment.

FIG. 15 is a flow diagram of an exemplary method performed by an exemplary repeater environment deploying a feedback cancellation loop adaptively coupled to an antenna array having an applied metric to improve isolation. As is shown, processing begins at block 1500 where a repeater transmitter leakage signal and desired received signal are received on M number of receivers. From there processing proceeds to block 1505 where the M receiver signals have respectively applied to them an M-complex-spatial-receive weight (e.g., the M receiver signals have their amplitude and/or phase modified). Processing proceeds to block 1510 where the weighted receiver signals are combined into a composite weighted signal. The composite weighted signal is processed by a leakage cancellation block to produce a post cancellation receive signal at block 1515. At block 1520, leakage cancellation block calculates updated values for its feedback loop based on one or more of the composite weighted signal, the post cancellation receive signal, and the delayed transmitter signal. In an illustrative implementation, the time constant associated with the update of feedback values can be considered to have a time constant Tc. A first-in-first-out (FIFO) delay line can then provide a selected time delay to the post cancellation leakage signal for use in de-correlating the transmit leakage signal from the receive signal at block 1522. Illustratively, the FIFO delay can be alternatively provided as a composite delay derived from the operation of an exemplary feedback cancellation loop cooperating with one or more cooperating repeater components comprising a filter component, an automatic gain control component, and other components providing beneficial operations in the repeating process such that the processing performed by one or more of these components as summed up provides sufficient time delay such that upon retransmission of the signal a delay ensures de-correlation between the transmitter leakage signal and the receive signal in the desired antenna elements. Generally, this composite delay is a multiple of the inverse of the bandwidth of the signals being repeated.

The baseband filtering block filters the post cancellation receive signal to produce a filtered post cancellation received signal at 1525. At 1530, the automatic gain control block utilized one or more of the pre-correlation leakage metric, residual leakage correlation metric, power in, power out, and isolation margin to perform an automatic gain control to the filtered post cancellation receive signal to produce an automatic gain control output signal. Processing then proceeds to 1540 where a spatial weighting block applies N complex spatial transmitter weights respectively to N copies of the automatic gain control (ACG) output signal. The N weighted repeater transmit signals are then transmitted by the N transmitters to at 1545 and are received at each of the M receivers at 1550 to form M repeater transmit leakage signals and are summed with the M desired receive signals to provide feedback cancellation operations.

Figure 16:
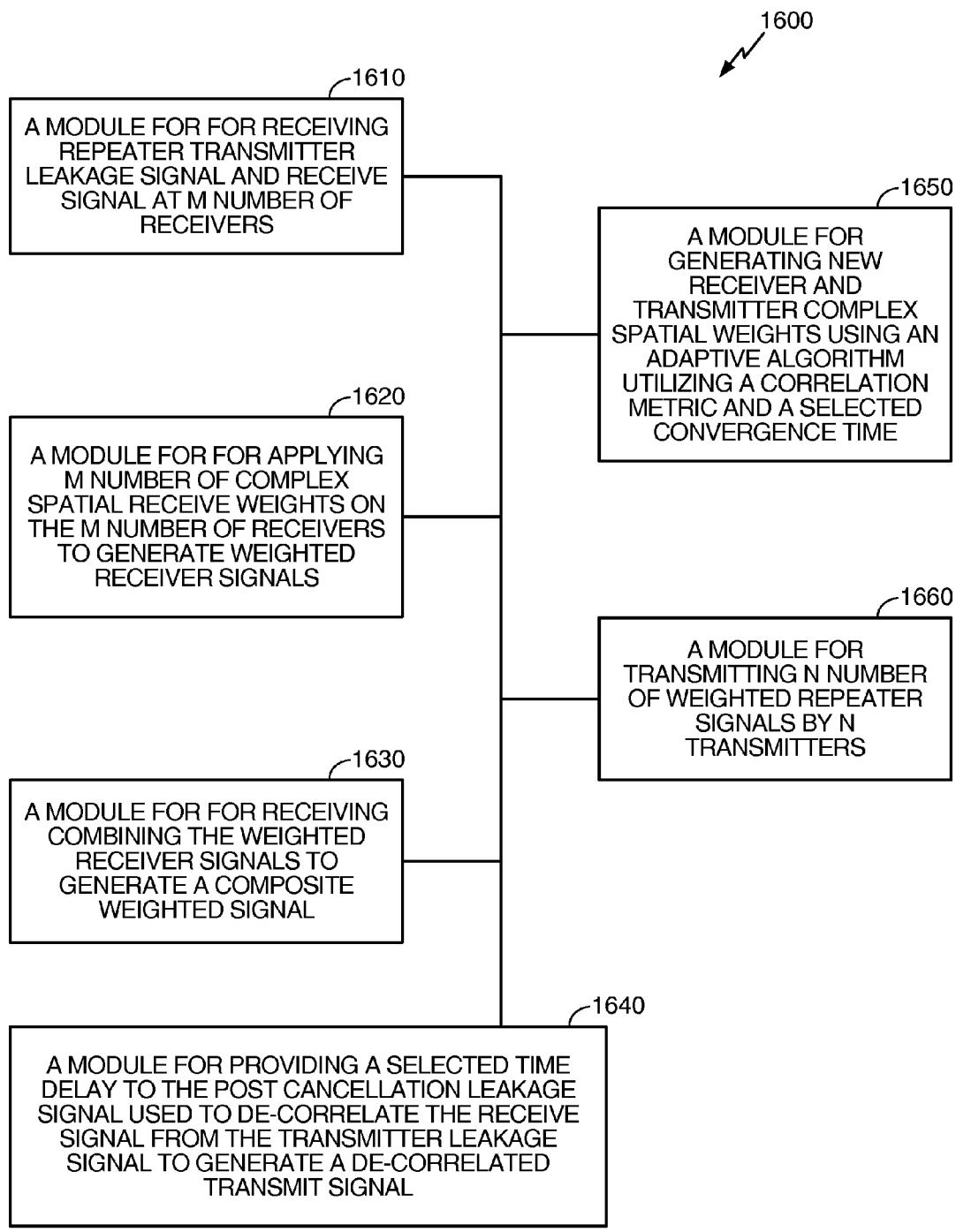
FIG. 16 illustrates an exemplary system that facilitates feedback loop cancellation in a repeater environment.

FIG. 16 illustrates a system 1600 that facilitates feedback loop cancellation in a repeater environment using a feedback loop. The system includes a module 1610 as a means for receiving repeater transmitter leakage signal and receive signals at M number of receivers; a module 1620 for applying M number of complex spatial receive weights on the M number of receivers to generate weighted receiver signals; a module 1630 for combining the weighted receiver signals to generate a composite weighted signal; a module 1640 for providing a selected time delay to the post cancellation leakage signal used to de-correlate the receive signal from the transmitter leakage signal to generate a de-correlated transmit signal; a module 1650 for generating new receiver and transmitter complex spatial weights using an adaptive algorithm utilizing a correlation metric and a selected convergence time; and a module 1660 for transmitting N number of weighted repeater signals by N transmitters. System 1600 further includes a module (not shown) for calculating updated values for the feedback loop based on one or more of the composite weighted signal, the post cancellation receive signal, and the delayed transmitter signal. It is to be appreciated that a module as described herein can comprise hardware, software, or a combination thereof. That is, the structure for performing each function can be hardware, software stored in one or more machine readable media, or a combination of hardware and software. In general, structure that can be implemented as hardware, software, or a combination can be referred to as "control logic."

The systems and methods for efficiently representing knowledge of the herein described systems and methods may also be applied to the context of resolving in memory data on the same provider. In such context, the in memory data may not be backed by a physical store, e.g., it might be used in a graph solver on the CPU to synchronize nodes. The herein described systems and methods may also be applied in the context of scene graphs, especially as they become more distributed on multi-core architectures and calculations are written directly to an in memory data structure such as a volumetric texture.

There are multiple ways of implementing the present herein described systems and methods, e.g., an appropriate API, tool kit, driver code, operating system, control, standalone or downloadable software object, etc. which enables applications and services to use the systems and methods for representing and exchanging knowledge in accordance with the herein described systems and methods. The herein described systems and methods contemplate the use of the herein described systems and methods from the standpoint of an API (or other software object), as well as from a software or hardware object that performs the knowledge exchange in accordance with the herein described systems and methods. Thus, various implementations of the herein described systems and methods may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the herein described systems and methods have been described in connection with various computing devices and network architectures, the underlying concepts may be applied to any computing device or system in which it is desirable to synchronize data with another computing device or system. For instance, the synchronization processes of the herein described systems and methods may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the herein described systems and methods, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the herein described systems and methods. In the case of program code execution on programmable computers, the computing device generally includes a processor, a storage medium readable by the processor (including volatile and non-volatile memory and/or storage elements), at least one input device, and at least one output device. One or more programs that may implement or utilize the synchronization services and/or processes of the herein described systems and methods, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the herein described systems and methods may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the herein described systems and methods. When implemented on a general-purpose processor, the program code combines with the processor to provide a unique apparatus that operates to invoke the functionality of the herein described systems and methods. Additionally, any storage techniques used in connection with the herein described systems and methods may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of FIG. 6. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the herein described systems and methods has been described in connection with the preferred embodiments of the various figures, it is to be understood that other similar embodiments may be used or modifications and additions may be made to the described embodiment for performing the same function of the herein described systems and methods without deviating therefrom. For example, while exemplary network environments of the herein described systems and methods are described in the context of a networked environment, such as a peer to peer networked environment, one skilled in the art will recognize that the herein described systems and methods are not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the herein described systems and methods in the context of particular programming language constructs, the herein described systems and methods are not so limited, but rather may be implemented in any language to provide methods for representing and exchanging knowledge for a set of nodes in accordance with the herein described systems and methods. Still further, the herein described systems and methods may be implemented in or across a plurality of processing chips or devices, and storage may similarly be effected across a plurality of devices. Therefore, the herein described systems and methods should not be limited to any single embodiment, but rather should be construed in breadth and scope in accordance with the appended claims.

What is claimed is:

1. A repeater for a wireless communication network, the repeater operative to provide feedback cancellation, the repeater comprising:
an antenna array comprising one or more antenna elements; and
an equalized feedback cancellation loop operatively coupled to the antenna array, and configured to operate on input signals to derive a metric that is employed to increase signal isolation and signal gain,
wherein the metric is indicative of level of a transmitter signal present at a receiver, and is a function of correlation between a transmitted signal and a received signal including a desired receiver signal, and
wherein the repeater has a delay that allows the transmitted signal to be de-correlated with the desired receiver signal, the transmitted signal is time aligned, and the transmitted signal is correlated with a feedback leakage signal.

2. The repeater as recited in claim 1, further comprising an equalizer in the equalized feedback cancellation loop.

3. The repeater as recited in claim 1, wherein the repeater is a radio frequency repeater wherein a processor controls adaption of weights based on the metric.

4. The repeater as recited in claim 1, wherein the repeater is a digital repeater.

5. The repeater as recited in claim 1, wherein the repeater is configured to perform feedback cancellation by performing one or more operations selected from the group consisting of using a beam former, calculating weights for application with the metric using a closed form solution using input and output signal samples, and determining a performance of feedback cancellation using a correlation metric.

6. The repeater as recited in claim 1, wherein the repeater is configured to determine an indication of level of the transmitter signal into the by correlating the transmitted signal with the received signal.

7. The repeater as recited in claim 1, wherein the delay is selected so that a new received signal is not correlated with the current transmit signal.

8. The repeater as recited in claim 7, wherein the leakage signal generated by the feedback cancellation loop is correlated to the transmitter signal.

9. The repeater as recited in claim 7, wherein a multipath delay spread is less than the delay through the repeater and the transmitter signal is de-correlated with a new received signal.

10. The repeater as recited in claim 7, wherein a time delay spread between a transmitter antenna and a receiver antenna of the antenna array is less than the inverse of the bandwidth of the signal being repeated.

11. The repeater as recited in claim 7, wherein the time delay is selected so that a time delay from the output of the feedback cancellation loop through cooperating digital processing components through digital-to-analog conversion components through transmission and propagation to a receive antenna of the antenna array is equal to or greater than the inverse of the bandwidth of the signal being repeated.

12. The repeater as recited in claim 7, wherein the time delay is selected so that a time delay from the output of the feedback cancellation loop as provided by a first-in-first-out (FIFO) delay line is equal to or greater than the inverse of the bandwidth of the signal being repeated.

13. The repeater as recited in claim 1, wherein the repeater is configured to perform a post-cancellation correlation operation following the operation of the feedback cancellation loop is performed to determine a post-cancellation correlation metric, and wherein the repeater is configured to substantially minimize the value of the post-cancellation correlation metric by applying weights to one or more components of the antenna array.

14. The repeater as recited in claim 13, where the repeater is configured to substantially minimize the value of the post-cancellation correlation metric by at least by executing one or more adaptive algorithms selected from the group consisting of a least mean squared algorithm, a recursive least squared algorithm, and an Bussgang algorithm.

15. The repeater as recited in claim 1, wherein the repeater is configured so the output of the repeater signal is digitally sampled and the metric is determined using a digital delay.

16. The repeater as recited in claim 1, wherein the repeater is a Time Division Duplex repeater and the wireless communication network is one of a Wireless-Fidelity (Wi-Fi), and Worldwide Interoperability for Microwave Access (Wi-max) network.

17. The repeater as recited in claim 1, wherein the repeater is a Frequency Division Duplex repeater and the wireless communication network is one of a cellular, Global System for Mobile communications (GSM), Code Division Multiple Access (CDMA), and ThirdGeneration (3G) network.

18. The repeater as recited in claim 1, wherein the antenna array includes at least one dipole antenna, at least one patch antenna, or a combination thereof.

19. A method to facilitate feedback loop cancellation in a repeater environment comprising:
receiving repeater transmitter leakage signal and receive signal at M number of receivers;
applying M number of complex spatial receive weights on the M number of receivers to generate weighted receiver signals;
combining the weighted receiver signals to generate a composite weighted signal;
providing a selected time delay to the post cancellation leakage signal used to de-correlate the receive signal from the transmitter leakage signal to generate a de-correlated transmit signal;
generating new receiver and transmitter complex spatial weights using an adaptive algorithm utilizing a correlation metric and a selected convergence time; and
transmitting N number of weighted repeater signals by N transmitters.

20. The method as recited in claim 19, further comprising processing the composite weighted signal by a leakage cancellation component to produce a post cancellation receive signal.

21. The method as recited in claim 20, further comprising calculating updated values by the leakage cancellation component for a feedback cancellation loop based on one or more values comprising composite weighted signal, the post cancellation receive signal, and delayed transmitter signal,
wherein a time constant associated with the feedback values have a time constant of Tc.

22. The method as recited in claim 20, further comprising filtering the post cancellation receive signal by a filtering component to produce a filtered post cancellation received signal.

23. The method as recited in claim 22, further comprising performing an automatic gain control of the filtered post cancellation receive signal to produce an automatic gain control (AGC) output signal utilizing one or more values comprising pre-correlation leakage metric, residual leakage correlation metric, power in, power out, and isolation margin.

24. The method as recited in claim 23, further comprising applying N number of complex spatial transmitter weights to N number of copies of the AGC output signal.

25. The method as recited in claim 24, further comprising receiving N number of repeater transmit signals at the M number of receivers to identify M number of repeater transmit leakage signals and summing the received M number of identified transmit leakage signals with M number of desired received signals.

26. A method to facilitate feedback loop cancellation in a repeater environment comprising:
receiving repeater transmitter leakage signal and receive signal at a receiver to classify as a composite receive signal;
generating a post cancellation receive signal by a leakage cancellation block;
providing a selected time delay to the post cancellation leakage signal used to de-correlate the receive signal from the transmitter leakage signal to generate a de-correlated transmit signal;
transmitting the de-correlated transmit signal; and
calculating updated values by the leakage cancellation component for a feedback cancellation loop based on one or more values comprising composite signal, the post cancellation receive signal, and delayed transmitter signal, wherein a time constant associated with the feedback values have a time constant of Tc.

27. The method as recited in claim 26, further comprising filtering the post cancellation receive signal by a filtering component to produce a filtered post cancellation received signal.

28. The method as recited in claim 27, further comprising performing an automatic gain control of the filtered post cancellation receive signal to produce an automatic gain control (AGC) output signal utilizing one or more values comprising pre-correlation leakage metric, residual leakage correlation metric, power in, power out, and isolation margin.

29. A method to facilitate feedback loop cancellation in a repeater environment comprising:
receiving repeater transmitter leakage signal and receive signal at a receiver to classify as a composite receive signal;
generating a post cancellation receive signal by a leakage cancellation block;
providing a selected time delay to the post cancellation leakage signal used to de-correlate the receive signal from the transmitter leakage signal to generate a de-correlated transmit signal;
transmitting the de-correlated transmit signal; and
receiving N number of repeater transmit signals at the M number of receivers to identify M number of repeater transmit leakage signals and summing the received M number of identified transmit leakage signals with M number of desired received signals.

30. A computer readable medium having stored thereon computer executable instructions for performing at least the following acts:
receiving repeater transmitter leakage signal and receive signal at M number of receivers;
applying M number of complex spatial receive weights on the M number of receivers to generate weighted receiver signals;
combining the weighted receiver signals to generate a composite weighted signal;
providing a selected time delay to the post cancellation leakage signal used to de-correlate the receive signal from the transmitter leakage signal to generate a de-correlated transmit signal;
generating new receiver and transmitter complex spatial weights using an adaptive algorithm utilizing a correlation metric and a selected convergence time; and
transmitting N number of weighted repeater signals by N transmitters.

31. A processor, comprising a memory having stored thereon computer executable instructions to cause the processor to performing at least the following acts:
receiving repeater transmitter leakage signal and receive signal at a receiver to classify as a composite receive signal;
generating a post cancellation receive signal by a leakage cancellation block;
providing a selected time delay to the post cancellation leakage signal used to de-correlate the receive signal from the transmitter leakage signal to generate a de-correlated transmit signal;
transmitting the de-correlated transmit signal; and
calculating updated values by the leakage cancellation component for a feedback cancellation loop based on one or more values comprising composite signal, the post cancellation receive signal, and delayed transmitter signal, wherein a time constant associated with the feedback values have a time constant of Tc.

32. A system that facilitates feedback loop cancellation in a repeater environment comprising:
means for receiving repeater transmitter leakage signal and receive signal at M number of receivers;
means for applying M number of complex spatial receive weights on the M number of receivers to generate weighted receiver signals;
means for combining the weighted receiver signals to generate a composite weighted signal;
means for providing a selected time delay to the post cancellation leakage signal used to de-correlate the receive signal from the transmitter leakage signal to generate a de-correlated transmit signal;
means for generating new receiver and transmitter complex spatial weights using an adaptive algorithm utilizing a correlation metric and a selected convergence time; and
means for transmitting N number of weighted repeater signals by N transmitters.

33. A repeater comprising:
a receiver configured to receive signals including a desired received signal and received transmitter leakage;
a feedback canceller configured to modify the received signals to remove at least some of the received transmitter leakage using current cancellation parameters;
a correlator configured to receive the output of the feedback canceller and a delayed output of the feedback canceller and to output a correlation metric by correlating the output of the feedback canceller with the delayed output of the feedback canceller; and
control logic to determine updated cancellation parameters using at least the correlation metric, wherein the feedback canceller includes a temporal equalizer, and wherein the current cancellation parameters include one or more temporal equalizer weights.

34. The repeater of claim 33, wherein the temporal equalizer comprises an N tap equalizer, where N is greater than one, and wherein the one or more temporal equalizer weights include N tap equalizer weights.

35. The repeater of claim 33, further comprising a first antenna array in communication with the receiver, the first antenna array including M antenna elements, wherein M is two or more.

36. The repeater of claim 35, further comprising a spatial equalizer configured to determine M spatial weights.

* * * * *